(12) United States Patent
Kato et al.

(10) Patent No.: US 8,532,332 B2
(45) Date of Patent: Sep. 10, 2013

(54) INFORMATION PROCESSOR, INFORMATION PROCESSING METHOD, AND PROGRAM FOR CONTENT DELIVERY

(75) Inventors: Motoki Kato, Kanagawa (JP); Kenjiro Ueda, Kanagawa (JP); Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 110 days.

(21) Appl. No.: 13/227,567

(22) Filed: Sep. 8, 2011

(65) Prior Publication Data

US 2012/0070031 A1 Mar. 22, 2012

(30) Foreign Application Priority Data

Sep. 17, 2010 (JP) ................. P2010-209733

(51) Int. Cl.
*G06K 9/00* (2006.01)
*G06K 9/34* (2006.01)
(52) U.S. Cl.
USPC .......................................... 382/100; 382/173
(58) Field of Classification Search
None
See application file for complete search history.

(56) References Cited

U.S. PATENT DOCUMENTS

| | | | |
|---|---|---|---|
| 6,490,681 B1 * | 12/2002 | Kobayashi et al. | 713/171 |
| 2003/0231767 A1 * | 12/2003 | Carbajal | 380/200 |
| 2006/0190403 A1 * | 8/2006 | Lin et al. | 705/51 |
| 2007/0217612 A1 * | 9/2007 | So | 380/277 |
| 2008/0267588 A1 | 10/2008 | Iwase et al. | |
| 2009/0147985 A1 * | 6/2009 | Chen et al. | 382/100 |

FOREIGN PATENT DOCUMENTS

JP 2007-104615 A 4/2007

OTHER PUBLICATIONS

JK Su, F Hartung, B Girod, "Digital watermarking of text, image, and video documents", Computers & Graphics, 1998—Elsevier.*
I Brown, C Perkins, J Crowcroft, "Watercasting: Distributed watermarking of multicast media", Networked Group Communication, 1999—Springer.*

* cited by examiner

*Primary Examiner* — Li Liu
(74) *Attorney, Agent, or Firm* — Sony Corporation

(57) ABSTRACT

An information processor includes a data processing portion which generates content for delivery to a client. The data processing portion generates and provides a sub-image in which identification information of a content delivery client is recorded in image data formed only of a partial area of image data and a main image in which the image signal of the sub-image area is deleted or substituted with a dummy signal to the client, generates management information in which the identification information recorded in the sub-image is associated with client information of the content provision destination, and records the management information in a storage portion.

11 Claims, 21 Drawing Sheets

FIG. 12

| UNIQUE ID | SUB-CONTENT SEGMENT CONFIGURATION INFORMATION | DELIVERY CONTENT INFORMATION | DELIVERY DESTINATION INFORMATION | DELIVERY USER | DELIVERY DATE INFORMATION |
|---|---|---|---|---|---|
| 5784102578 | UNIQUE ID: xx TO yy<br>MAC: aa TO bb<br>ECC: pp TO qq | ABC STORY | xyz@patnet.co.jp | SUZUKI ICHIRO | 07. 22. 2010 |
| 2354711245 | UNIQUE ID: xx TO yy<br>MAC: aa TO bb<br>ECC: pp TO qq | xyk DIGEST | jkl@ynos.ne.jp | TANAKA KAORU | 09. 15. 2010 |
| .. | .. | .. | .. | .. | .. |

FIG. 15

| UNIQUE ID | SUB-CONTENT SEGMENT CONFIGURATION INFORMATION | DELIVERY CONTENT INFORMATION | DELIVERY DESTINATION INFORMATION | DELIVERY USER | DELIVERY DATE INFORMATION | ENCRYPTION KEY INFORMATION |
|---|---|---|---|---|---|---|
| 5784102578 | UNIQUE ID: xx TO yy<br>MAC : aa TO bb<br>ECC : pp TO qq | ABC STORY | xyz@patnet.co.jp | SUZUKI ICHIRO | 07. 22. 2010 | 🔑🔑🔑 |
| 2354711245 | UNIQUE ID: xx TO yy<br>MAC : aa TO bb<br>ECC : pp TO qq | xyk DIGEST | jkl@ynos.ne.jp | TANAKA KAORU | 09. 15. 2010 | 🔑🔑🔑 |
| .. | .. | .. | .. | .. | .. | .. |

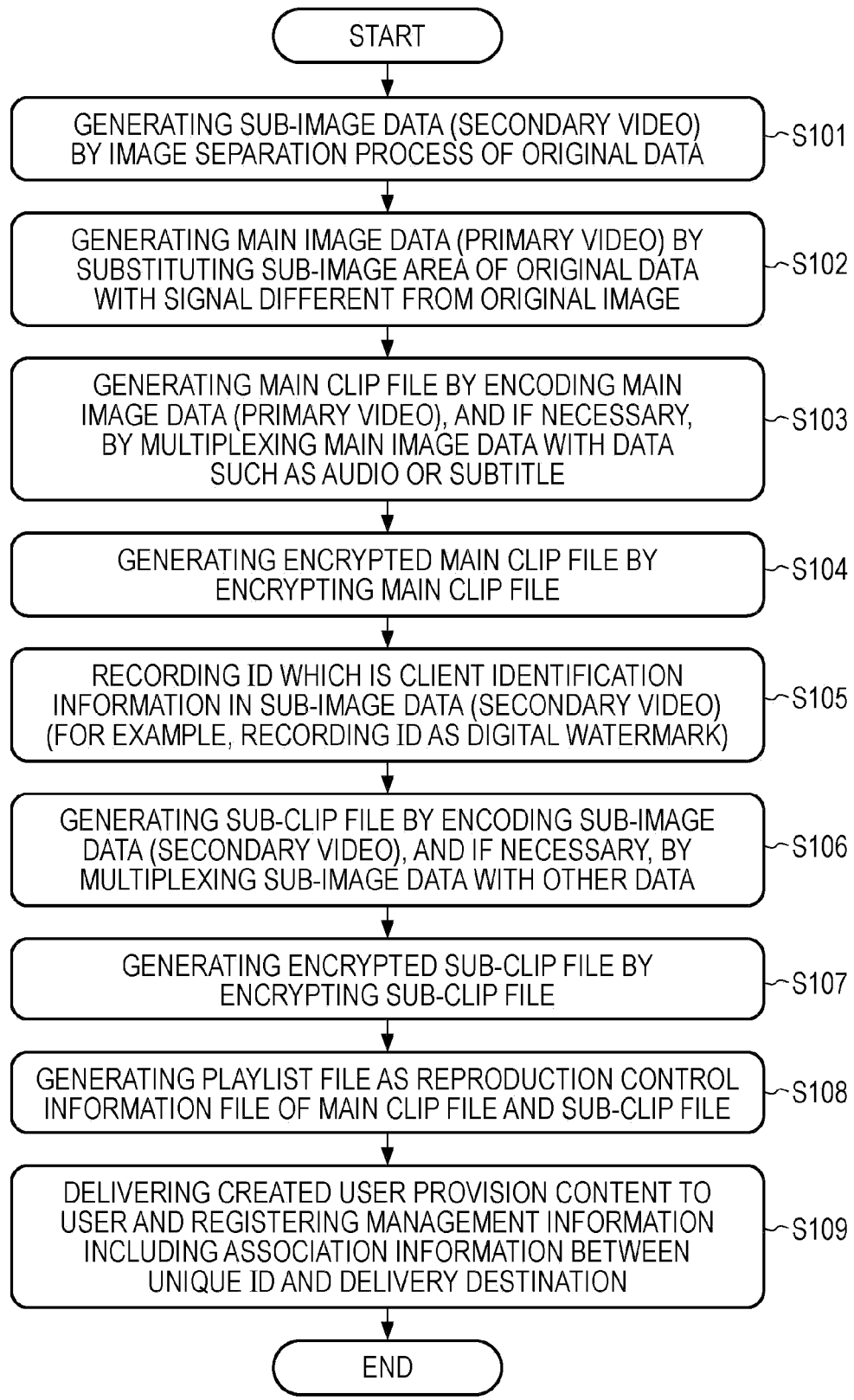

INFORMATION PROCESSOR, INFORMATION PROCESSING METHOD, AND PROGRAM FOR CONTENT DELIVERY

CROSS-REFERENCE TO RELATED APPLICATION

The present application claims priority from Japanese Patent Application No. JP 2010-209733 filed in the Japanese Patent Office on Sep. 17, 2010, the entire content of which is incorporated herein by reference.

BACKGROUND

The present disclosure relates to an information processor, an information processing method, and a program. Particularly, the present disclosure relates to an information processor which is used in a system enabling the prevention of fraudulent use of content and the tracking of the origin of illegally distributed content, an information processing method, and a program.

Recently, data communication via the network such as the internet has become popular, and a large amount of image data, music data, and the like are actively distributed via the network.

The makers or sellers of much of the content such as music data and image data possess copyright, the distribution rights, and the like thereof. Accordingly, for example, when a service provider provides content to users via the network from a server, use control is generally carried out to allow only users having a legal right of use to use the content.

Specifically, for example, content is transmitted as encrypted content, and control or the like is carried out to decrypt the content only by using an encryption key which is provided to users who have performed a legal content purchase process. However, even when such a process is performed, the content is distributed in a disorderly manner when the user performs a process where the decrypted content is re-distributed via the network.

SUMMARY

It is desirable to provide an information processor enabling the specification of a distribution source of illegally distributed content, an information processing method and a program.

According to a first embodiment of the present disclosure, there is provided an information processor including: a data processing portion which generates content for delivery to a client, in which the data processing portion generates and provides a sub-image in which identification information of a content delivery client is recorded in image data formed only of a partial area of image data and a main image in which the image signal of the sub-image area is deleted or substituted with a dummy signal to the client, generates management information in which the identification information recorded in the sub-image is associated with client information of the content provision destination, and records the management information in a storage portion.

Furthermore, in the information processor according to the embodiment of the present disclosure, the data processing portion may generate a sub-image in which the identification information is recorded as digital watermark data in the sub-image.

Furthermore, in the information processor according to the embodiment of the present disclosure, the data processing portion may acquire the identification information which is included in the sub-image by a process of analyzing the sub-image included in the distributed content, and specify a client as a content delivery destination by a process of matching the acquired identification information to information registered in the management information.

Furthermore, in the information processor according to the embodiment of the present disclosure, the data processing portion may generate a sub-image in which a luma key area is set for output of a pixel value of the main image as an effective pixel value when a partial area of the sub-image is reproduced.

Furthermore, in the information processor according to the embodiment of the present disclosure, the data processing portion may generate and provide a playlist file as a reproduction control information file for reproduction of a synthetic image by reproduction of the main image and the sub-image in parallel to the client.

Furthermore, in the information processor according to the embodiment of the present disclosure, the data processing portion may hold a plurality of different digital watermark-recorded contents in which digital watermark data different in units of segment which is partition data of the content is recorded, and select a different combination of segments in delivery process units to the client from the plurality of different digital watermark-recorded contents to generate content in which a digital watermark data row in units of segment which is client identification information is set.

Furthermore, in the information processor according to the embodiment of the present disclosure, the data processing portion may hold a plurality of different encrypted contents each formed of encrypted segments to which an encryption key different in units of segment which is partition data of the content is applied, and select a different combination of segments in delivery process units to the client from the plurality of different encrypted contents to generate encrypted content to be provided to the client.

Furthermore, in the information processor according to the embodiment of the present disclosure, the data processing portion may generate management information in which key information of the encryption key applied to the encrypted content which is provided to the client is associated with client information of the content provision destination, and record the management information in the storage portion.

Furthermore, in the information processor according to the embodiment of the present disclosure, the data processing portion may specify a client as a destination of the delivery of the content and the key by acquiring the information on the distributed key and matching the acquired key information to information registered in the management information.

Furthermore, according to a second embodiment of the present disclosure, there is provided an information processor including: a data processing portion which executes a content reproduction process, in which the data processing portion acquires a sub-clip file storing a sub-image in which identification information of a content delivery client is recorded in image data formed only of a partial area of image data and a main clip file storing a main image in which the image signal of the sub-image area is deleted or substituted with a dummy signal, and applies a playlist file which is a reproduction control information file for execution of a process of reproducing the main clip file and the sub-clip file in parallel to generate and reproduce a synthetic image of the main image and the sub-image.

Furthermore, according to a third embodiment of the present disclosure, there is provided an information processing method which is executed in an information processor, including: generating a sub-image in which identification information of a content delivery client is recorded in image data formed only of a partial area of image data and a main image in which the image signal of the sub-image area is deleted or substituted with a dummy signal; providing the sub-image and the main image to the client; generating management information in which the identification information recorded in the sub-image is associated with client information of the content provision destination; and recording the management information in a storage portion.

Furthermore, according to a fourth embodiment of the present disclosure, there is provided a program enabling an information processor to execute information processing, including: generating a sub-image in which identification information of a content delivery client is recorded in image data formed only of a partial area of image data and a main image in which the image signal of the sub-image area is deleted or substituted with a dummy signal using a data processing portion; providing the sub-image and the main image to the client; generating management information in which the identification information recorded in the sub-image is associated with client information of the content provision destination; and recording the management information in a storage portion.

The program according to the embodiment of the present disclosure is a program which is able to be provided to, for example, an information processor or a computer system capable of executing various programs and codes by a computer-readable storage medium or communication medium. When such a program is provided in a computer-readable form, a process according to the program is realized on an information processor or a computer system.

Other objects, characteristics, and advantages of the present disclosure will be further described in detail on the basis of embodiments of the present disclosure and the accompanying drawings. In the present disclosure, the system is a logical aggregation of a plurality of devices, and the respective constituent devices may not be disposed in the same housing.

According to the configuration of the embodiment of the present disclosure, there is provided a configuration enabling the verification of the origin of illegally distributed content from the illegally distributed content. A sub-image in which identification information of a content delivery client is recorded as, for example, a digital watermark in image data formed of a partial area of image data, and a main image in which an image signal of the sub-image area is deleted or substituted with a dummy signal are generated and provided to the client. Furthermore, management information in which the identification information recorded in the sub-image is associated with client information of the content provision destination is generated and managed. When illegally distributed content is found, the identification information recorded in the sub-image which is included in the illegally distributed content is analyzed and matched to data registered in the management information, and thus the delivery source is able to be determined.

BRIEF DESCRIPTION OF THE DRAWINGS

FIG. 12 is a diagram illustrating an example of the data configuration of management information which is held in a storage section of the server.

FIG. 15 is a diagram illustrating an example of the data configuration of management information which is held in the storage section of the server.

FIG. 16 is a diagram showing a flowchart illustrating a content generation processing sequence which is executed in the server of a service provider or the like.

FIG. 17 is a diagram showing a flowchart illustrating a content provision processing sequence which is executed in the server of a service provider or the like.

DETAILED DESCRIPTION OF EMBODIMENTS

Hereinafter, an information processor, an information processing method, and a program according to an embodiment of the present disclosure will be described in detail with reference to the drawings. The description will be given in the following order.

1. Concept of Embodiment of Present Disclosure
2. Specific Example of Content Provision Process of Server
3. Content Delivery Process Using CDN
4. Example of Process of Generating Sub-Content Using Luma Key
5. Client Content Reproduction Process
6. Specific Example of Process of Recording Identifier (ID) in Sub-Image
7. Example of Configuration of Content Encryption Process 8. Sequences of Server Content Generation and Provision
8-1. Server Content Generation Processing Sequence
8-2. Server Content Provision Processing Sequence
9. Client Content Reproduction Sequence
10. Server Origin Determination Processing Sequence based on Illegally Distributed Content
11. Example of Hardware Configuration of Each Device

1. Concept of Embodiment of Present Disclosure

Hereinafter, an information processor, an information processing method, and a program according to an embodiment of the present disclosure will be described in detail with reference to the drawings.

First, the concept of an embodiment of the present disclosure will be described with reference to FIG. 1. According to the embodiment of the present disclosure, for example, it is possible to specify the source of illegal content which is distributed on the network.

Figure 1:
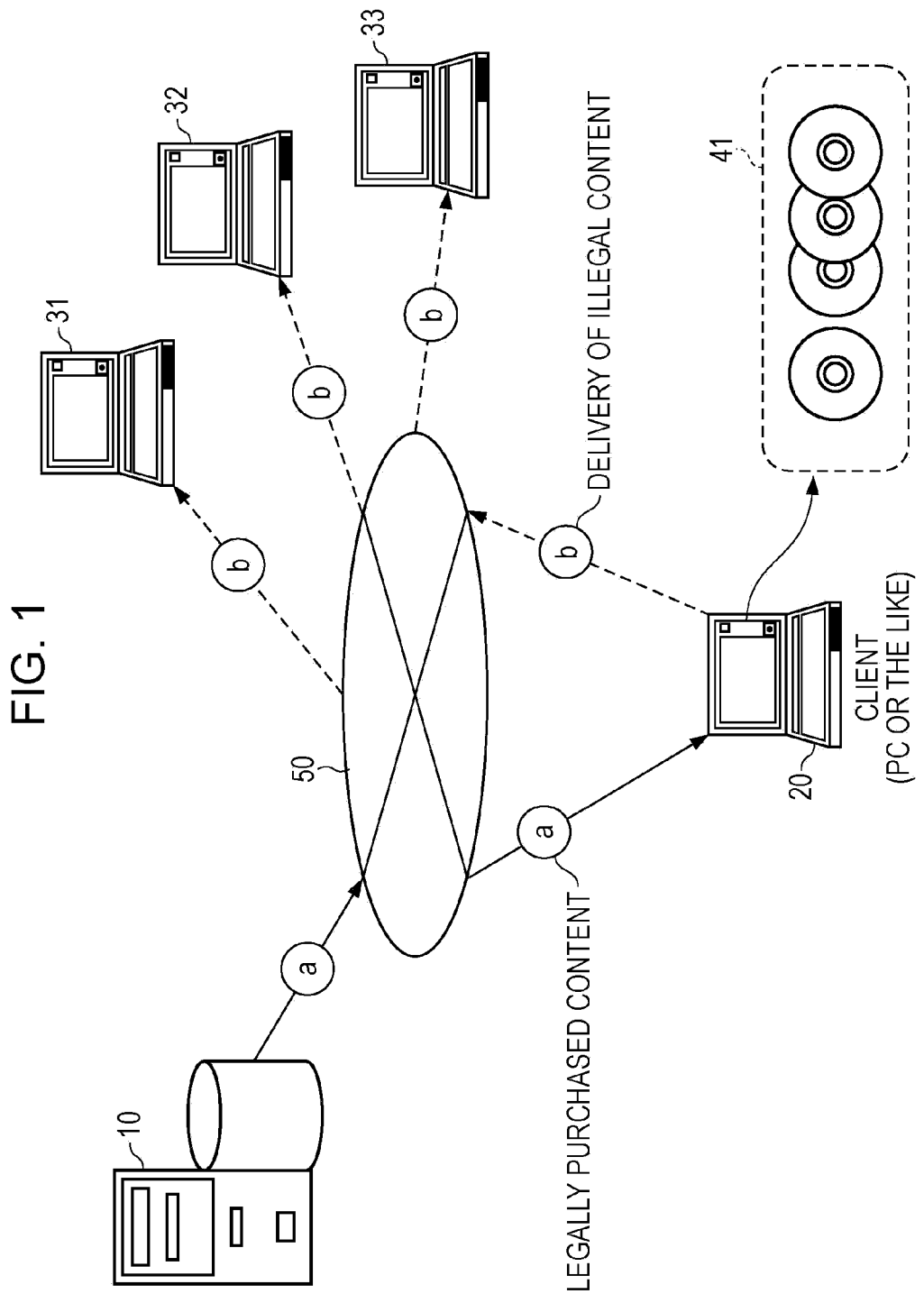
FIG. 1 is a diagram illustrating the concept of an embodiment of the present disclosure.

FIG. 1 shows a server 10 which is operated by a service provider providing contents such as movies and music.

A client 20 such as a PC accesses the server 10 and performs a legal content purchase procedure to acquire content. The legal content is acquired via a route (a) on the network shown in FIG. 1.

A user of the client 20 is permitted to reproduce the legally purchased content under certain use restrictions. For example, even when the distributed content is encrypted content, the legal purchaser is able to decrypt and reproduce the encrypted content by applying a key which is provided from the server or a decryption key which is retained in advance.

However, the user of the client 20 may illegally provide the decrypted content to other users (users of clients 31 to 33 shown in the drawing) via the network. For example, the decrypted content may be provided to a large indefinite number of users via a route (b) on the network shown in FIG. 1.

Otherwise, in some cases, the user of the client 20 illegally records the decrypted content on a medium such as a disk and creates large amounts of illegal copy recording media to provide the media to other users. For example, disks 41 shown in FIG. 1 are used.

According to an embodiment of the present disclosure, when the distribution of such illegal content is detected, the origin of the illegal content is able to be specified. In FIG. 1, the origin is the client 20.

2. Specific Example of Content Provision Process of Server

As described above, according to an embodiment of the present disclosure, the origin of illegal content is able to be traced, and in order to realize this process, the server which provides legal contents performs a process of generating and providing content having a particular configuration to the client.

A specific example of the content provision process in the server which is operated by a service provider will be described with reference to FIG. 2 and the like. The server creates and provides particular content for enabling the specification of a client or a user who illegally distributes the content to each of the clients.

Figure 2:
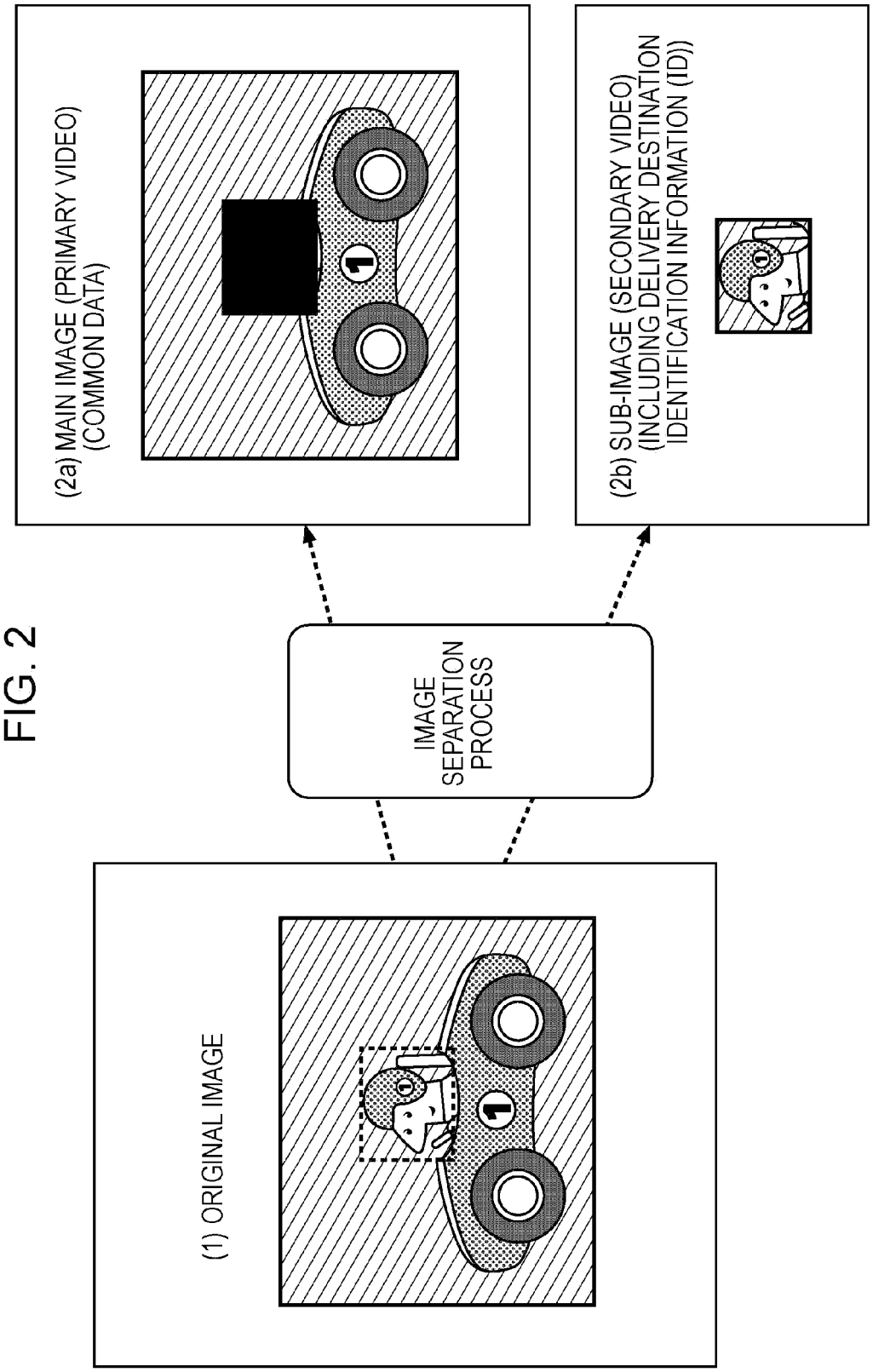
FIG. 2 is a diagram illustrating a specific example of content which is provided by a server.

FIG. 2 is a diagram illustrating a specific example of content which is provided by the server.

An original image (1) in FIG. 2 shows one frame image of content such as a movie.

As shown in FIG. 2, the server providing the content separates this original image (1) to generate (2a) a main image (primary video) and (2b) a sub-image (secondary video).

A partial image of the original image is set as the sub-image, and the main image is generated as an image in which the sub-image part in the original image is substituted with another data (dummy signal) or deleted.

When the main image and the sub-image are synthesized, the original image is made.

FIG. 2 shows only one image frame of the content. However, all of the image frames of the content, or at least some frames thereof are separated into main images and sub-images and provided to the client.

The server provides (2a) the main image (primary video) as data (content) common to a plurality of clients.

Regarding (2b) the sub-image (secondary video), each of the different pieces of identification information is recorded as independent data in client units or in delivery process units, and then independently provided. In the sub-image, identification information (ID) in client units to which the content is provided, or in delivery process units is recorded, and generated as an image by which at least the client to which the content is provided is able to be identified.

(2b) The sub-image (secondary video) is different data in which an ID different in client units or in units of content delivery is recorded.

However, during a normal observation of an image which is reproduced by synthesizing the main image and the sub-image, the ID information may not be recognized, and any synthetic image is able to be reproduced as the same image content as the original image.

The analysis of the identification information (ID) recorded in the sub-image is performed using a machine which performs the analysis of illegally distributed contents, for example, a particular analysis device of a service provider.

Specifically, the identification information (ID) recording process is executed as, for example, a digital watermark recording process, and the analysis of the identification information (ID) is executed as a process of reading out digital watermark data.

(2b) The sub-image shown in FIG. 2 is one image frame of the content, and in this one image frame, constituent bits of the ID for client identification, for example, one to several bits are stored. The pieces of bit information recorded in the sub-images which are set over a plurality of image frames are connected to each other, and thus a client ID is configured.

Specifically, for example, when 64 bits of a client ID is used, one-bit client ID constituent data is recorded in each of image frames 1 to 64.

In order to prevent a reading error, it is preferable that the same client ID is repeatedly recorded in image frames of the content.

For example, a first bit of a client ID is recorded in image frames 1 to 10, a second bit of the client ID is recorded in image frames 11 to 20, and a third bit of the client ID is recorded in image frames 21 to 30.

Using such a setting, an ID formed of an arbitrary number of bits may be recorded.

The frames in which the above-described sub-image is set may be the entire content, for example, all of frames of movie content. However, only some frames thereof may be a combination of a main image and a sub-image, and in the other frames, the sub-image may not be set and only the main image may be set.

Next, the configuration of the server which generates content which is provided to the client and a process thereof will be described with reference to FIG. 3.

Figure 3:
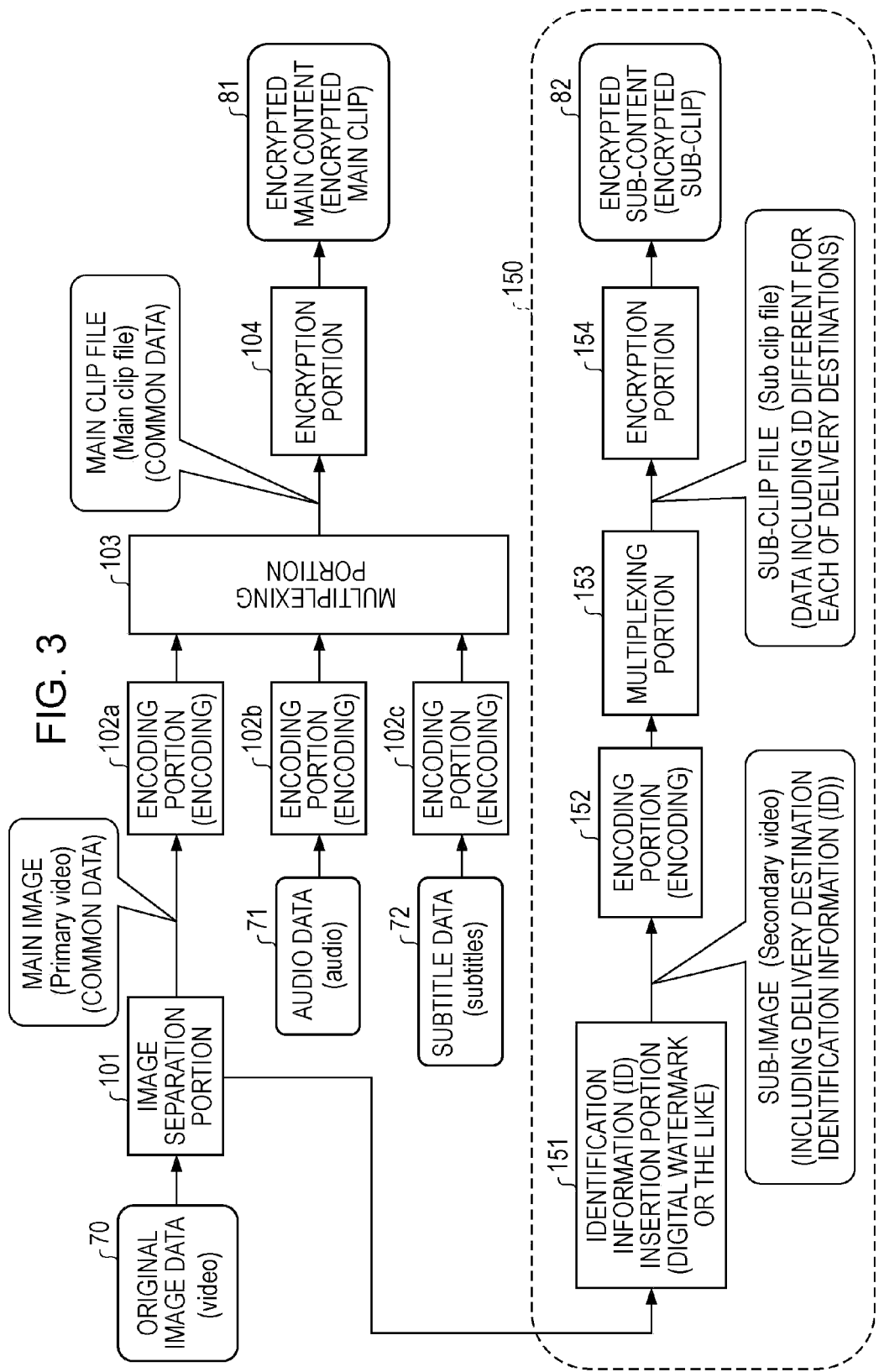
FIG. 3 is a diagram illustrating the configuration of the server which generates content which is provided to a client and a process thereof.

FIG. 3 is a diagram showing an example of the configuration of a data processing portion which executes a content generation process in the server.

Original image data 70 is video data which includes images corresponding to the original image (1) described with reference to FIG. 2.

An image separation portion 101 performs an image separation process on each of frame images constituting this original image data (video) 70, and generates main images and sub-images. That is, (2a) the main images (primary video) and (2b) the sub-images (secondary video) described with reference to FIG. 2 are generated.

The main images and the sub-images may be generated in all of the frames of the frame images constituting the original image data (video) 70. In addition, the main images and the sub-images may be generated in some frames, and in the other frames, only main images (=original images) may be set without setting the sub-images.

The main image which is generated in the image separation portion 101 is input to an encoding portion 102a to be subjected to an encoding process (encoding) such as MPEG compression in the encoding portion 102a.

Furthermore, audio data (audio) 71 and subtitle data (subtitle) 72 which are reproduced together with the image data are also subjected to an encoding process in an encoding portion 102b and 102c, respectively.

The images, the audio, and the subtitle respectively encoded in the encoding portion 102a to 102c are multiplexed in a multiplexing portion 103, and thus a main clip file storing these pieces of data is generated.

Next, the main clip file is input to an encryption portion 104 to be encrypted.

The encrypted clip file is encrypted main content (encrypted main clip) 81 shown in the drawing.

This encrypted main content (encrypted main clip) 81 is provided to each of the clients as data common to the clients.

The sub-image separated in the image separation portion 101, that is, the sub-image which is a part of image constituting the original image data 70 and is constituted of a partial image removed from the main image is input to an identification information (ID) insertion portion 151.

The identification information (ID) insertion portion 151 performs a process of recording ID information for identifying, for example, a client which is a content delivery destination in each of the sub-images.

As described above, a configuration may be provided in which an ID is able to be read from any place in the entire content such as a movie, and various settings of a sub-image having an ID set therein are available.

For example, an ID formed of a plurality of bits is constituted by connecting pieces of bit information which are recorded in sub-images set in some of a plurality of image frames to each other.

For example, constituent bits of a client ID are recorded as digital watermark data in sub-images which are set in the respective image frames of content.

A specific example of the bit setting using digital watermark data which is applied to a plurality of frames will be described later.

The sub-images in which the ID is recorded are subjected to an encoding process such as MPEG compression as in the case of main image. Furthermore, if necessary, multiplexing with data other than the images, for example, audio data or the like is executed in a multiplexing portion 153, and thus a sub-clip file is generated.

The generated sub-clip file is encrypted in an encryption portion 154, and thus encrypted sub-content (encrypted sub-clip) 82 is generated.

This encrypted sub-content 82 is not client common data. The encrypted sub-content 82 is generated individually in client units or in delivery process units and is provided to the clients.

The information on a client to which the sub-content 82 is provided is recorded and held as management information in the server. This management information will be described later.

The process shown by a dotted line frame 150 shown in FIG. 3 is a process in client units or in units of content delivery, and is sequentially executed.

The following data generated by the server shown in FIG. 3, that is, (1) the encrypted main content (encrypted main clip) 81 and (2) the encrypted sub-content (encrypted sub-clip) 82 are provided to each of the clients.

As data which is provided to a client by the server, not only the encrypted main clip formed of the encrypted main content and the encrypted sub-clip formed of the encrypted sub-content, which have been described with reference to FIG. 3, but also other data is provided.

Specifically, a playlist file is provided in which reproduction control information which is used to perform content reproduction with the clips applied thereto is recorded. Furthermore, an encryption key and the like for decrypting the encrypted main clip or the encrypted sub-clip are provided to the client. A specific example of the encryption key will be described later.

3. Content Delivery Process Using CDN (1) The encrypted main content (encrypted main clip) 81 is provided as data common to the clients.

(2) The encrypted sub-content (encrypted sub-clip) is provided to a client as client-specific data in which identification information different for each of the provision clients is recorded.

In order to efficiently deliver such client common data and client-specific data, for example, a Content Distribution Network (CDN) using a plurality of cache servers is effectively used. When performing content delivery with the CDN applied thereto, efficient content delivery is able to be realized.

Figure 4:
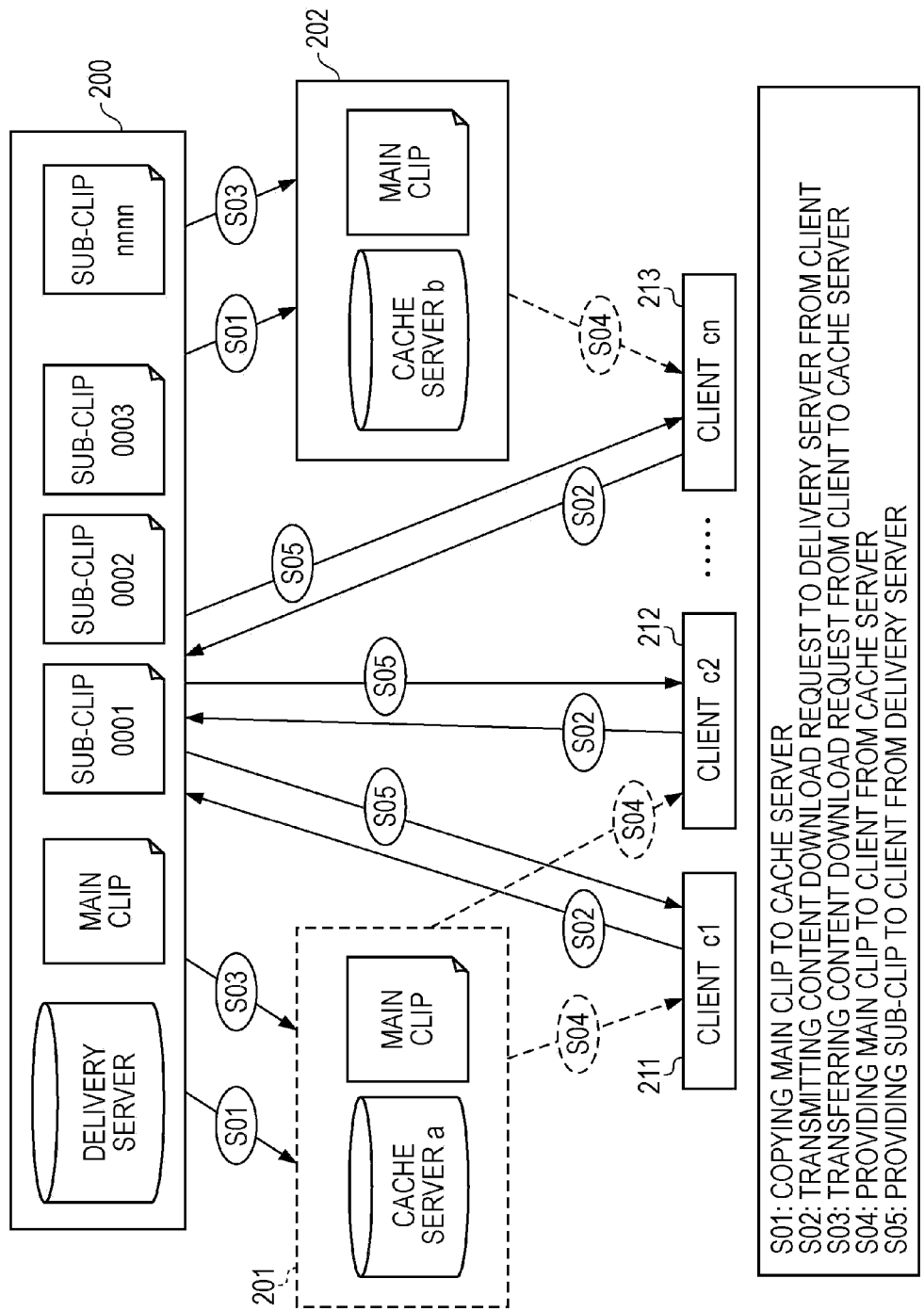
FIG. 4 is a diagram illustrating a content delivery process using a CDN.

A content delivery process using the CDN will be described with reference to FIG. 4. FIG. 4 shows a delivery server 200, a cache server a, 201, a cache server b, 202, and clients c1, 211 to cn, 213.

The delivery server 200 is a server which is a content delivery source generating (1) the encrypted main content (encrypted main clip) 81 and (2) the encrypted sub-content (encrypted sub-clip) 82, which have been described with reference to FIG. 3.

The cache server a, 201 and the cache server b, 202 are, for example, cache servers each corresponding to a specific region. Specifically, the cache server a, 201 and the cache server b, 202 are, for example, cache servers each corresponding to clients of a specific region such as European, North America, or Asia which is set in regional units. Otherwise, the cache server a, 201 and the cache server b, 202 are cache servers which are set by content type.

FIG. 4 shows the two cache servers, but the number of cache servers is arbitrary. A larger number of cache servers may be provided.

In the configuration shown in FIG. 4, a process of providing content to the clients c1 to cn, 211 to 213 is performed in accordance with a sequence from Step S01 to Step S05 shown in the drawing.

First, in Step S01, the delivery server 200 provides copy data of a main clip to each of the cache servers and stores them in the cache servers.

The main clip corresponds to the main content 81 shown in FIG. 3 and is data which is provided commonly to all of the clients.

Next, in Step S02, the clients c1 to cn, 211 to 213 transmit a request for delivery (download) of the content to the delivery server 200.

Next, in Step S03, the delivery server 200 transfers the content delivery request from the client to the corresponding cache server.

For example, a content delivery request from a client in Europe is transferred to a cache server corresponding to the region of Europe, and a content delivery request from a client in Japan is transferred to a cache server corresponding to the region of Japan or Asia.

Next, in Step S04, the cache server which receives the content delivery request of the client from the delivery server provides the main clip, which has been received in advance from the delivery server 200, to the client.

Finally, in Step S05, the delivery server 200 generates a different sub-clip including a sub-image in which an identifier (ID) different in client units (or in units of delivery) is recorded in client units, and provides the sub-clip to each of the clients.

In the content delivery using a Content Distribution Network (CDN), many cache servers are used, and thus a load of data delivery is able to be dispersed, and delivery delay and the like which occur by an increase in the processing load due to one specific server is able to be prevented.

In the process according to an embodiment of the present disclosure, the main clip is mainly delivered by the dispersed cache servers, and the sub-clip is delivered by the delivery server 200. However, the data amount of the sub-clip is small compared with the data amount of the entire content. Accordingly, the amount of data which is delivered to one client by the delivery server 200 is small, whereby even when the process for many clients is concentrated, the processing amount thereof is very small as compared with the process of delivering the entire content, and thus there is a low possibility of large delay.

4. Example of Process of Generating Sub-Content Using Luma Key

In the above description, examples of the image data which is generated by the server, that is, (2a) the main image (primary video) and (2b) the sub-image (secondary video) have been described with reference to FIG. 2.

The example of the setting of the main image and the sub-image has been described with reference to FIG. 2 in which a partial image of an original image is set as a sub-image, and a main image is generated as an image in which the sub-image area in the original image is deleted or substituted with another data.

Figure 5:
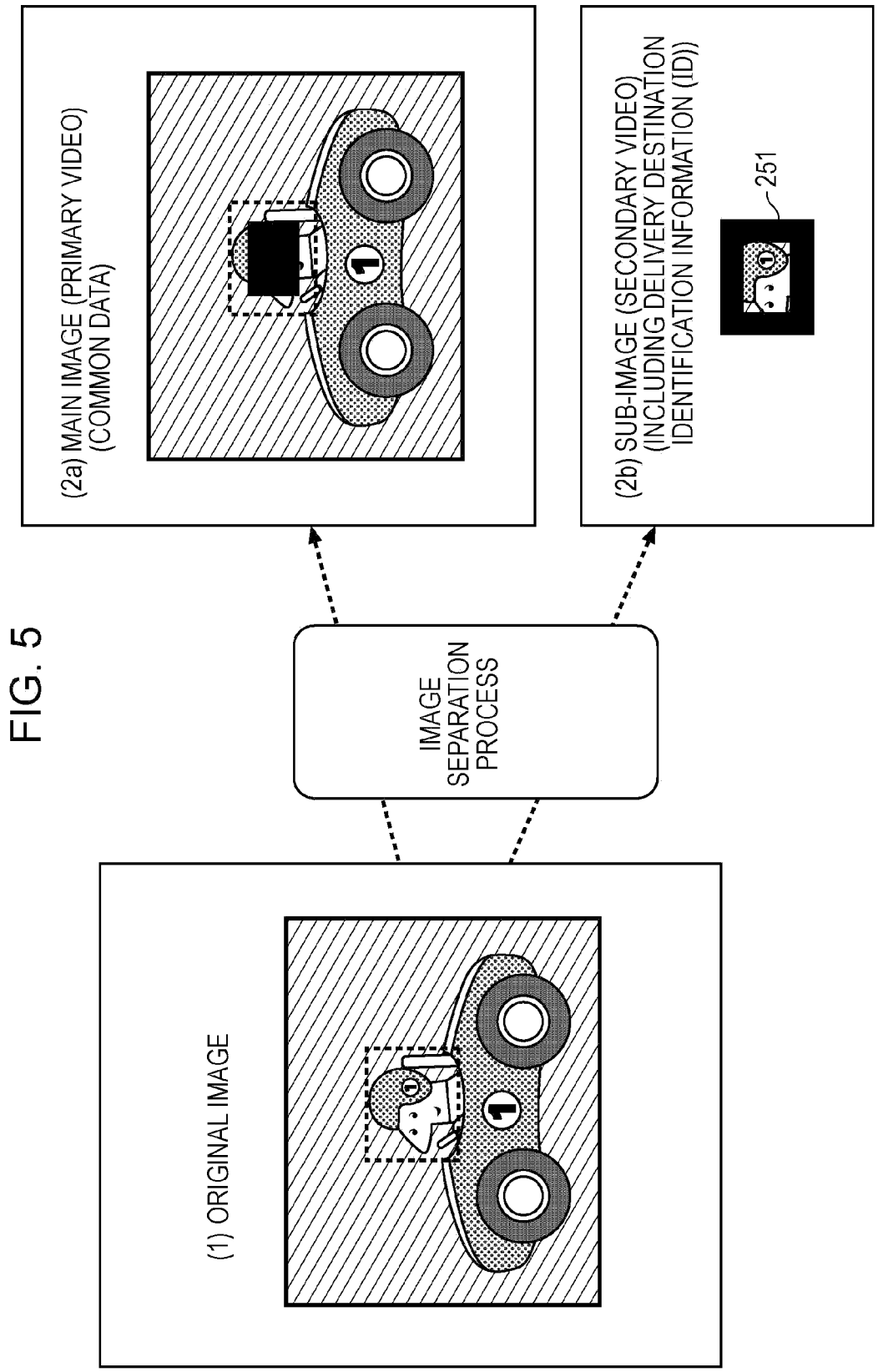
FIG. 5 is a diagram illustrating an example using a luma key which is a specific example of content which is provided by the server.

However, the example of the process of generating the main image (primary video) and the sub-image (secondary video) is not limited to the setting shown in FIG. 2, and for example, a setting using a luma key shown in FIG. 5 may also be made.

The luma key is an image synthesis method of substituting pixels in a specific luminance area with another image. For example, this is a process of setting in advance a pixel part in a predetermined luminance value range as a sub-image and substituting the pixel part with the pixel value of a main image. The predetermined luminance value range which is a substitution target is referred to as a luma key. In the example shown in FIG. 5, an area 251 having a specific luminance value is set in an outline part (black area in the drawing) of (2b) the sub-image. Regarding the luma key area, the pixel value of (2a) the main image is output as a pixel value effective on a synthetic image.

In the synthetic image, the effective image which is acquired from (2b) the sub-image shown in FIG. 5 is an image only in a small image area surrounded by the luma key area 251, and only the pixel value of this area is acquired from (2b) the sub-image. Regarding all the other image area, the pixel value of (2a) the main image shown in FIG. 5 is effective.

In a reproduction process with regard to a client, the main image and the sub-image are synthesized with each other, and thus the synthetic image is reproduced.

In the example shown in FIG. 2, an image synthesis process is executed in which all of the pixel values of pixels corresponding to the position of the sub-image among constituent pixels of the main image are substituted with the values of constituent pixels of the sub-image.

In the example shown in FIG. 5, by using the pixel value of the sub-image only in an image area other than the luma key area in the sub-image, and by using all of the pixel values of the main image in all the other image parts including the luma key area, a synthetic image is generated.

5. Client Content Reproduction Process

Next, an example of a content reproduction process with regard to a client will be described with reference to FIG. 6 and the like.

As described with reference to FIG. 3, the server generates and provides (2a) the main image (primary video) and (2b) the sub-image (secondary video) to the client.

These images are the images described with reference to, for example, FIGS. 2 and 5, and in the sub-image, an identifier (ID) different for each of the clients or for each of the delivery processes is recorded.

A client device, for example, a user PC receives these pieces of data from the server, stores the data in a recording medium such as a hard disk of the client (PC or the like), and executes a reproduction process.

As described above, the server transmits, other than encrypted clip files including a main image and a sub-image, a playlist file as a reproduction control information file and a decryption key for the encrypted clip files to a client.

The client stores these received pieces of data in a storage portion, and reads out and reproduces these pieces of data from the storage portion.

Figure 6:
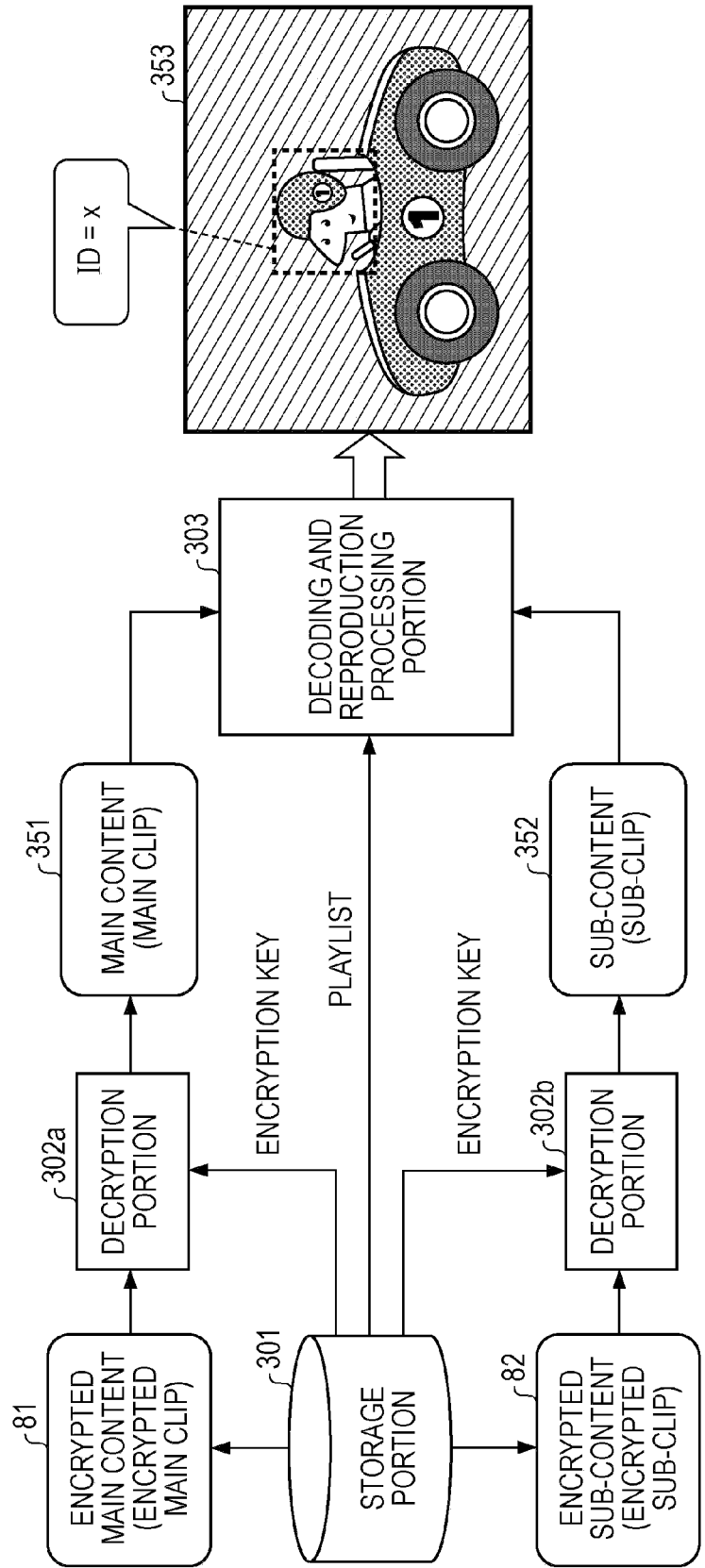
FIG. 6 is a diagram illustrating an example of a content reproduction process with regard to a client.

FIG. 6 is a block diagram showing the configuration of the content reproduction process of a client such as a user's PC.

The encrypted main content (encrypted main clip) 81 and the encrypted sub-content (encrypted sub-clip) 82 are data received (downloaded) from the server and stored in a storage portion 301.

These pieces of data are subjected to a decryption process by using a decryption key in decryption portions 302a and 302b, respectively, and thus decrypted main content (main clip) 351 and decrypted sub-content (sub-clip) 352 are output. The key data is, for example, key data which is acquired with the content from the server.

These clips are decoded and reproduced in a decoding and reproduction processing portion 303. An example of a reproduction output image is a synthetic image 353. This image is a synthetic image of the following two images, that is, (2a) the main image (primary video) and (2b) the sub-image (secondary video), which have been described with reference to FIG. 2 or FIG. 5.

In the sub-image included in this synthetic image, the constituent data of an identifier (ID) in client units (or in units of delivery) is recorded as, for example, digital watermark data.

In the content reproduction process, playlist file which is a reproduction control information file is used. This playlist file is a file which is received from the server together with the contents including the main image and the sub-image.

An example of the content reproduction process using a playlist file will be described with reference to FIG. 7.

Figure 7:
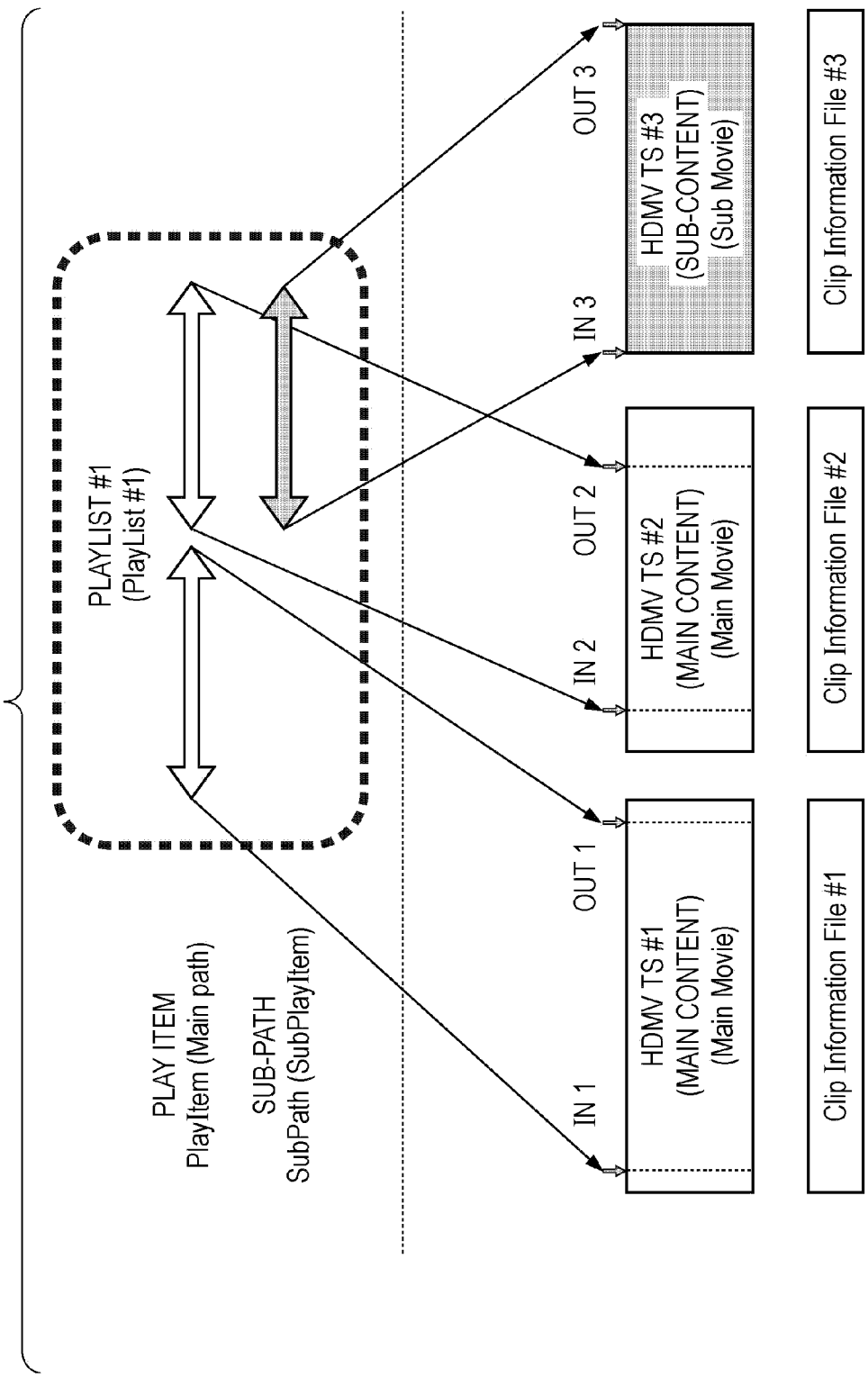
FIG. 7 is a diagram illustrating an example of a content reproduction process using a playlist file.

A playlist file #1 shown in FIG. 7 has a configuration in which a play item which has reproduction designation information showing a reproduction start position and an end position of the clip information file of video contents, and a sub-path are set in parallel.

The play item is reproduction control information with regard to the main content (main clip), and the sub-path is reproduction control information corresponding to the sub-content (sub-clip).

The playlist file #1 shown in the drawing has a configuration in which only a play item is set in the early part of the playlist, and a play item and a sub-path are set in parallel in the latter part.

FIG. 7 shows an example of the playlist #1 in which two play items and one sub-path are set. However, the set number of play items and sub-paths is not limited to this example, and various settings are able to be made.

In the content reproduction process with the playlist shown in FIG. 7 applied thereto, first, only one play item is used after start of the reproduction to execute the reproduction of the main content. Thereafter, the play item and the sub-path are applied to execute a parallel reproduction of the main content and the sub-content.

The sub-path is used as reproduction control information of an image, an audio, a subtitle or the like which is reproduced together with the play item which is reproduction control information of the main image.

In the process example shown in FIG. 7, the sub-path is a sub-path which is used as reproduction control information with regard to the clip file storing the sub-image described with reference to FIGS. 2 and 4.

The main content which is reproduced by the play item and the sub-content which is reproduced by the sub-path are contents having the main image and the sub-image described with reference to FIGS. 2 and 4.

The main content is content including image data common to all of the clients and users, and the sub-content is content including a sub-image in which an identifier (ID) corresponding to each client is recorded.

Such a process of displaying a first image (main image) together with a second image (sub-image) is referred to as Picture-In-Picture (PinP).

The content reproduction process with this PinP applied thereto employs a reproduction method which is defined as a reproduction process with the playlist file applied thereto.

In the playlist file, type information regarding the type of the sub-path is recorded other than information on the play item and the sub-path defining the reproduction start position and the end position shown in FIG. 7. When the sub-path is a PinP sub-path, in the playlist file, sub-path definition information (Sub-Path_type=5) showing that the sub-path is a PinP sub-path is recorded.

Furthermore, in the playlist file in which the PinP sub-path is defined, information on the output position of the sub-image in the clip file which is designated by the sub-path is also recorded. In the reproduction process, the output position of the sub-image with respect to the main image is determined by applying this position information, and then the synthetic image is generated and reproduced.

6. Specific Example of Process of Recording Identifier (ID) in Sub-Image

First, as described with reference to FIGS. 2 to 5, the server generates sub-images, each of which has an identifier in client units or in units of content delivery recorded therein, and individually provides the sub-images to clients. This is because, one day, when copy content and the like are illegally leaked, the origin thereof is able to be analyzed by using this identifier recorded in the sub-image.

A specific example of a process of generating and providing sub-content in which an identifier (ID) is recorded will be described with reference to FIG. 8 and the like. In the following process example, an example of the generation and provision of sub-content in which an identifier (ID) using a digital watermark is recorded will be described.

Figure 8:
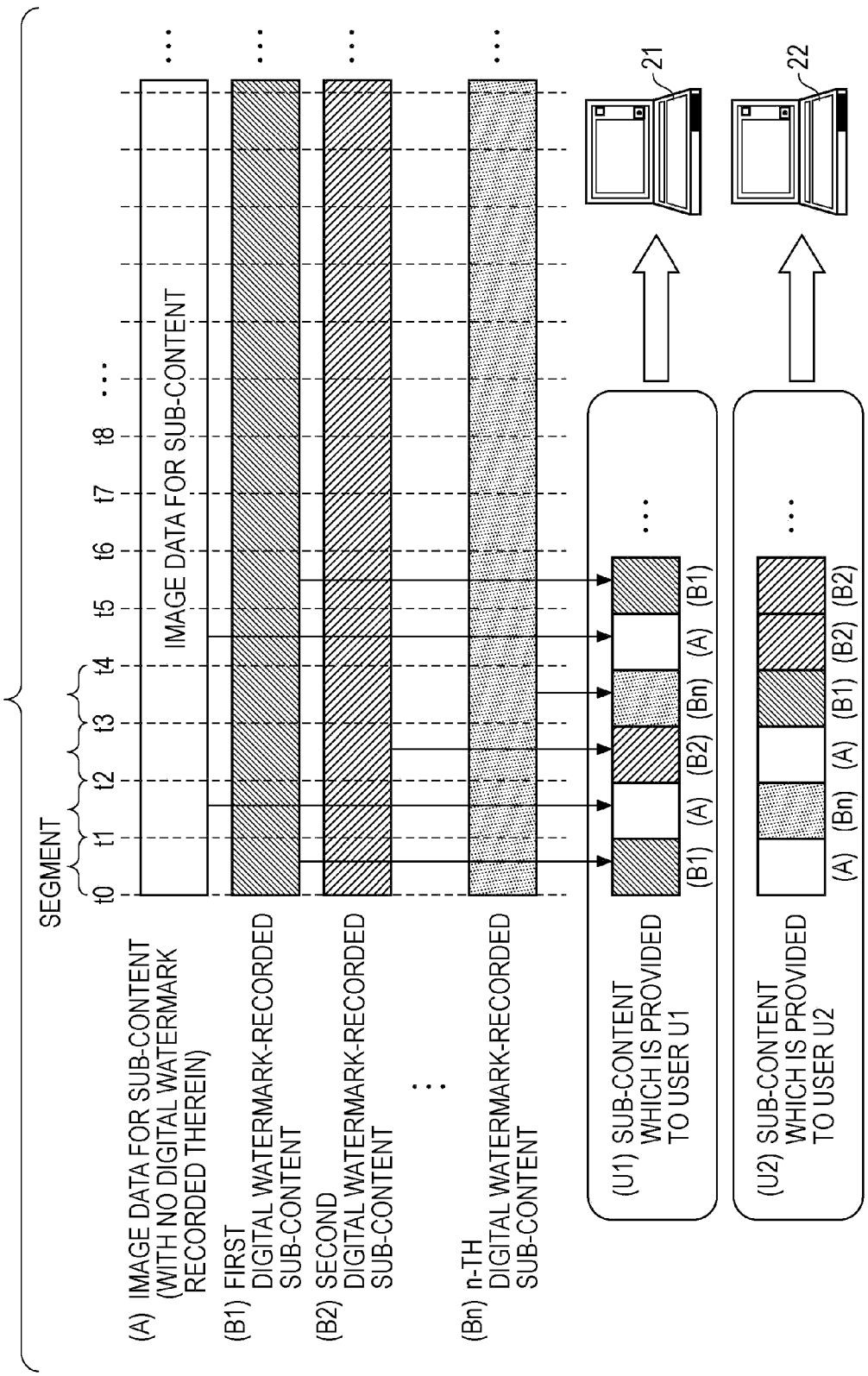
FIG. 8 is a diagram illustrating an example of a process of recording an identifier (ID) as a digital watermark.

The server generates data (A), (B1), ..., and (Bn) shown in FIG. 8 in advance.

(A) Image data for sub-content (with no digital watermark recorded therein) is video data constituted only of an image area of the sub-image described with reference to FIGS. 2 and 4. However, no identifier using a digital watermark is embedded.

In FIG. 8, reproduction times t0, t1, t2, ... are set in the rightward direction and video content is shown.

(A) The image data for sub-content (with no digital watermark recorded therein) is a partial image of each of constituent frames of video content, is image data constituted only of an image area of the sub-image described with reference to FIGS. 2 and 5, and is an image having no identifier (ID) recorded therein.

The server generates digital watermark-recorded sub-contents (B1) to (Bn) shown in FIG. 8, in which specific bit information is recorded in this (A) the image data for sub-content (with no digital watermark recorded therein).

(B1) to (Bn) represent sub-contents in which different pieces of digital watermark data are recorded, respectively. That is, the following plurality of digital watermark-recorded sub-contents are created by recording different digital watermark patterns in the (A) the image data for sub-content.

The plurality of digital watermark-recorded contents, that is, (B1) the first digital watermark-recorded sub-content, (B2) the second digital watermark-recorded sub-content, ... and (Bn) the n-th digital watermark-recorded sub-content, are created.

In these (A) image data for sub-content (with no digital watermark recorded therein), (B1) first digital watermark-recorded sub-content, (B2) second digital watermark-recorded sub-content, ... and (Bn) n-th digital watermark-recorded sub-content, divided segments are set. One segment includes at least one or more sub-images constituting a plurality of image frames.

For example, as shown in the drawing, a reproduction time from t0 to t1 corresponds to a first segment, a reproduction time from t1 to t2 corresponds to a second segment, and a reproduction time from t2 to t3 corresponds to a third segment, and in this manner, the contents (A) to (Bn) are divided into segments at the same sectioning positions (t0, t1, t2, ...).

It is necessary that the sectioning positions (t0, t1, t2, ... ) of the contents (A) to (Bn) are in the same positions. However, the sizes of the segments such as the first segment, the second segment, and the third segment may not be uniform.

Furthermore, as shown in the lower part of FIG. 8, the sub-contents (A) to (Bn) which are divided into segments are combined to generate sub-contents to be provided to users.

In the example shown in FIG. 8, (U1) content which is provided to a user U1 is sub-content which is configured to have a setting in which a segment of t0 to t1 corresponds to (B1) the first digital watermark-recorded sub-content, a segment of t1 to t2 corresponds to (A) the sub-content with no digital watermark recorded therein, a segment of t2 to t3 corresponds to (B2) the second digital watermark-recorded sub-content, a segment of t3 to t4 corresponds to the n-th digital watermark-recorded sub-content, . . . .

The segment array of (U1) the content which is provided to a user U1 is B1, A, B2, Bn, A, B1, . . . , and the array in units of segment of digital watermark bits in the array is 1, 0, 2, n, 0, 1, . . . . The digital watermark data of (A) the sub-content with no digital watermark recorded therein is interpreted as "0".

In this manner, by selecting the segments of the sub-contents (A) to (Bn) in units of segment constituted of a plurality of sub-images set as reproduction image frames for a predetermined time, and by connecting the selected segments to each other, one sub-content for provision to a user is created, and thus a unique digital watermark data row in units of segment is set, whereby this digital watermark data row is able to be used as a client identifier.

Sub-content which is provided to a user U2 different from the user U1 is sub-content which is configured to have a setting in which a segment of t0 to t1 corresponds to (A) the sub-content with no digital watermark recorded therein, a segment of t1 to t2 corresponds to (Bn) the n-th digital watermark-recorded sub-content, a segment of t2 to t3 corresponds to (A) the sub-content with no digital watermark recorded therein, a segment of t3 to t4 corresponds to (B1) the first digital watermark-recorded sub-content, . . . .

(U2) The content which is provided to a user U2 has a segment array of (A), (Bn), (A), (B1), (B2), (B2), . . . , and the array in units of segment of digital watermark bits in the array is 0, n, 0, 1, 2, 2, . . . .

In this manner, the server creates and delivers the sub-contents using segment combinations different for each of the sub-contents which are provided to the clients, whereby it is possible to generate and provide sub-contents each formed of a different digital watermark array.

Even when the segment combinations are different from each other, the sub-contents have the same image (video) main body data, and only the digital watermark data embedded in the contents is different. Accordingly, the reproduction contents which are observed by the users are the same reproduction data such as a movie.

Clients 1 and 21 receive "(U1) the sub-content which is provided to a user U1" from the server.

In addition, the clients 1 and 21 receive the main clip storing the main content common to the clients and the sub-clip storing "(U1) the sub-content which is provided to a user U1".

The clients store these received contents in a medium such as a hard disk, and then reading out and reproduce the contents from the hard disk.

In the content reproduction, the digital watermark data is a low-level signal which is not observed, and the user U1 can reproduce the contents without recognizing the recording of the digital watermark.

Clients 2 and 22 receive "(U2) the sub-content which is provided to a user U2" having a segment array different from that of "(U1) the sub-content which is provided to a user U1" via the network, and stores the received sub-content in a medium such as a hard disk.

The clients 2 and 22 also receive the main clip storing the main content common to the clients and the sub-clip storing "(U2) the sub-content which is provided to a user U2".

Thereafter, the received contents are read out and reproduced from the hard disk. The user U2 can also reproduce the contents without recognizing the recording of the digital watermark.

In this manner, the server provides the respective delivery contents to the respective users (clients) as contents which are set as all different combinations of segments.

A specific example of the digital watermark-recorded content will be described with reference to FIG. 9.

Figure 9:
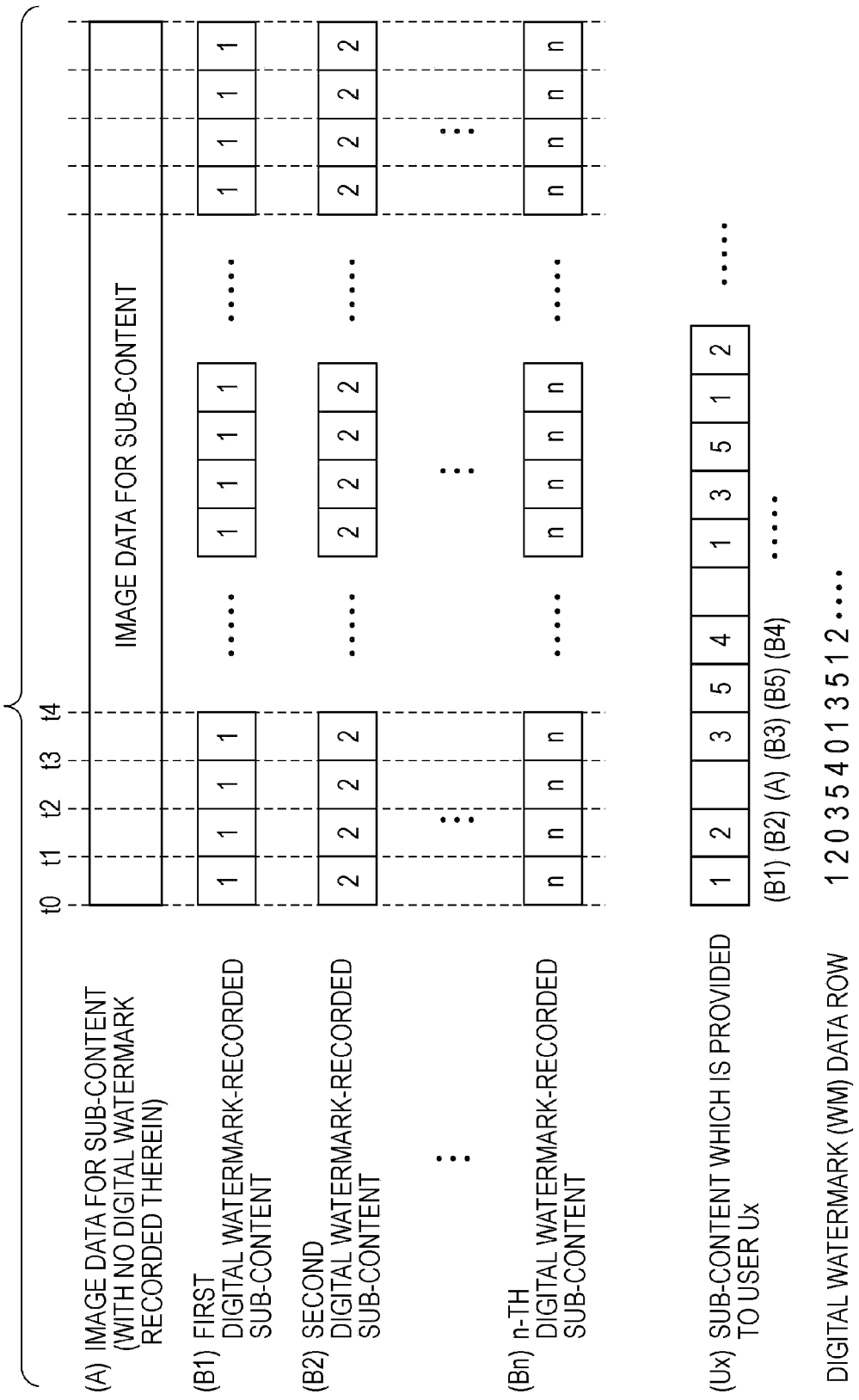
FIG. 9 is a diagram illustrating a specific example of digital watermark-recorded content.

In FIG. 9, as in FIG. 8, as data for sub-content generation which is used to generate sub-content which is provided to a client (user) by the server, a plurality of pieces of data, that is, (A) image data for sub-content (with no digital watermark recorded therein), (B1) first digital watermark-recorded sub-content, (B2) second digital watermark-recorded sub-content, . . . and (Bn) n-th digital watermark-recorded sub-content, are shown.

The digital watermark (WM)-recorded sub-contents (B1) to (Bn) are set as (B1) the sub-content in which data [1] is recorded as digital watermark data in each segment, (B2) the sub-content in which data [2] is recorded as digital watermark data in each segment, . . . , and (Bn) the sub-content in which data [n] is recorded as digital watermark data in each segment, that is, sub-contents with digital watermark data recorded therein having such a setting.

Various settings are able to be made as digital watermark embedding modes. For example, a lot of data such as information on the presence or absence of a digital watermark and combination data of digital watermark data (1 to N) are recorded in each of a plurality of sub-images included in one segment.

For example, information indicating the presence of a digital watermark and bit data (1) are recorded in a high-frequency area of a plurality of sub-images included in one segment (t0 to t1) of (B1) the first digital watermark-recorded sub-content. These pieces of data are difficult to discriminate with the naked eye during an image reproduction time, and are minute-level data which is able to be detected by a digital watermark detection process.

In the example shown in FIG. 9, (B1) the first digital watermark-recorded sub-content has a setting in which the same digital watermark data [1] is recorded in all of the segments of the content, and (B2) the second digital watermark-recorded sub-content has a setting in which the same digital watermark data [2] is recorded in all of the segments of the content.

Similarly, n-th digital watermark-recorded sub-content has a setting in which the same digital watermark data [n] is recorded in all of the segments of the content.

The content provision server of a service provider or the like generates contents to be provided to the users by using a plurality of digital watermark-recorded contents having such a setting.

(Ux) Sub-content which is provided to a user Ux shown in FIG. 9 has a row of selected segments of (B1), (B2), (A), (B3), (B5), (B4), . . . , and this content has a digital watermark data row of 1, 2, 0, 3, 5, 4, 0, . . . .

As described above, the segment of sub-content having no digital watermark recorded therein is interpreted as recording of digital watermark information of data=[0].

A setting can also be made in which the segment of content having no digital watermark recorded therein is not used.

As shown in FIG. 9, the n digital watermark-recorded sub-contents (B1) to (Bn) are digital watermark-recorded contents in which the same pieces of digital watermark data [1] to [n] are recorded in all of the segments.

Delivery contents in which various different digital watermark data rows are set is able to be generated by combining these n kinds of digital watermark-recorded sub-contents (B1) to (Bn), or by combining and arranging these n kinds of digital watermark-recorded sub-contents and sub-contents having no digital watermark embedded therein in units of segment. These different digital watermark data rows are used as client identifiers or delivery processing identifiers.

The server generates and provides delivery contents having a segment array, that is, a digital watermark data row different for each new content delivery.

The server manages a portion of data in the digital watermark data row, which is included in delivery content which is provided to a client (user), as a unique ID which is identification information corresponding to the delivery content.

This unique ID is registered and held as management information of the server.

A specific example of the digital watermark data including a unique ID in units of delivery content will be described with reference to FIG. 10.

Figure 10:
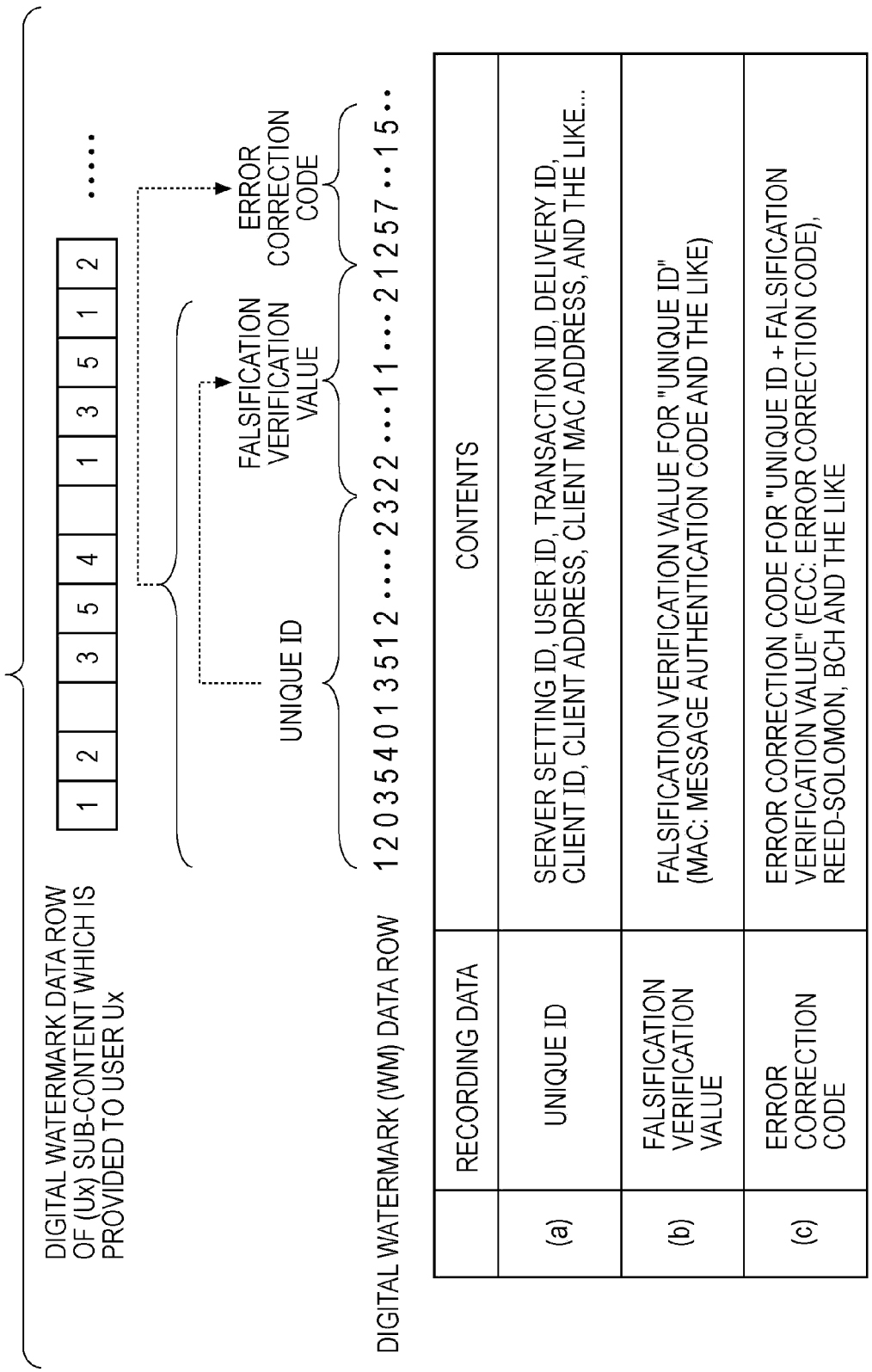
FIG. 10 is a diagram illustrating a specific example of digital watermark data including a unique ID in units of delivery content.

FIG. 10 shows a data row in sub-content which is provided to a user Ux, which is the one user delivery content described with reference to FIG. 9. That is, FIG. 10 shows a digital watermark data row recorded in (Ux) the sub-content which is provided to a user Ux.

The digital watermark data row is a data row of 1203540 . . . .

This digital watermark data row includes data, that is, (1) a unique ID which is set in association with the sub-content, (2) falsification verification value (MAC: Message Authentication Code) for the unique ID, and (3) an Error Correction Code (ECC) for (unique ID and MAC value).

The data set of (1) to (3) is set in a repeated manner in one delivery content.

The unique ID is an ID for identification of each delivery content. This unique ID may be an ID which is generated by, for example, a random number generation process in the server delivering the contents, and as shown in FIG. 10, a user ID, a transaction ID, a delivery ID, a client device ID, a client address, a client MAC address and the like may be applied. The unique ID may be set as an ID for identification of each delivery content.

A falsification verification value is falsification verification value for the unique ID, and for example, a Message Authentication Code (MAC) is used.

The error correction code is an Error Correction Code (ECC) for (unique ID and MAC value), and for example, data such as Reed Solomon or BCH is used.

First, the server which delivers contents including sub-contents determines a unique ID corresponding to the delivery content, and then calculates a MAC value corresponding to the unique ID. Furthermore, the server calculates an ECC for (unique ID+MAC).

A digital watermark data row is determined which matches a data row formed of the [unique ID/MAC/ECC] which is set as a result of the above process, and in accordance with the determined digital watermark data row, segments are sequentially selected from the contents described with reference to FIGS. 8 and 9, that is, (A) the image data for sub-content (with no digital watermark recorded therein), (B1) the first digital watermark-recorded sub-content, (B2) the second digital watermark-recorded sub-content, . . . , and (Bn) the n-th digital watermark-recorded sub-content to generate delivery content.

Figure 11:
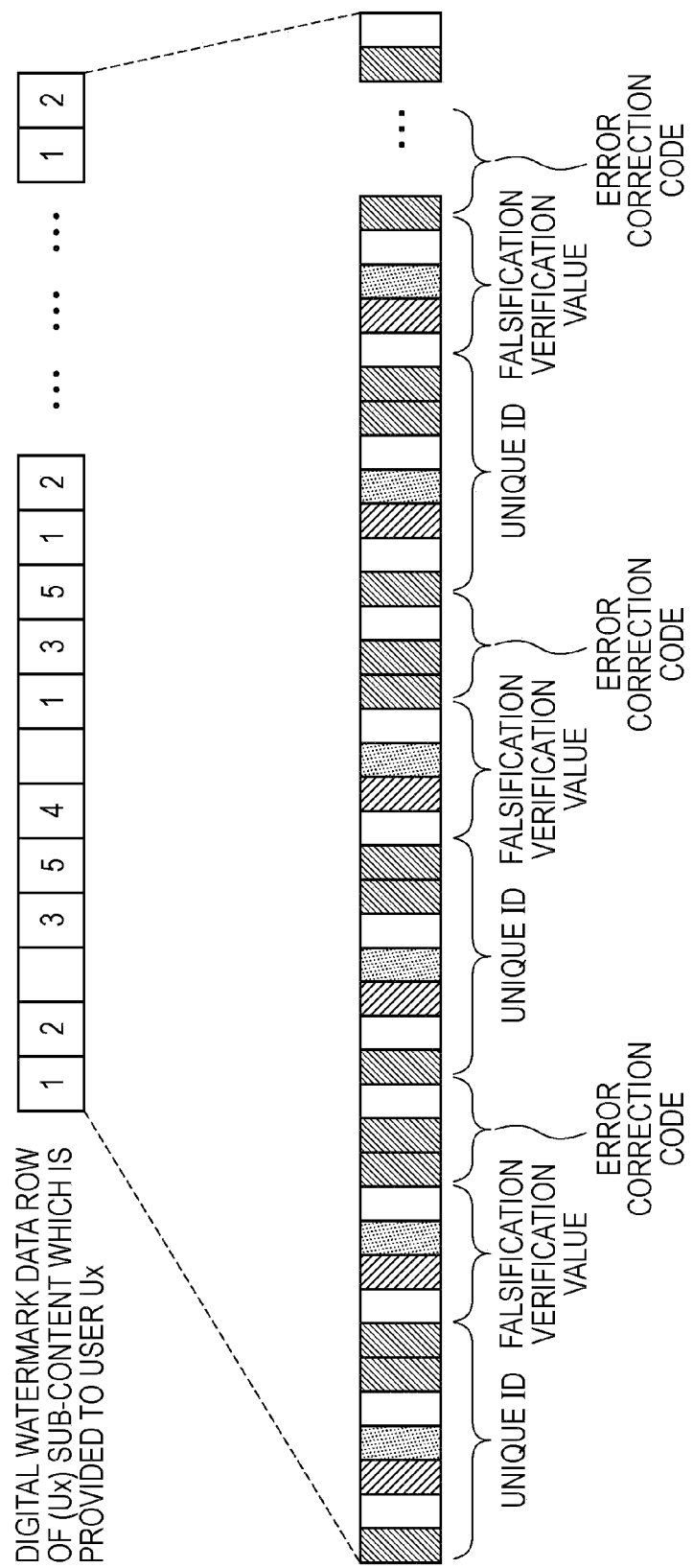
FIG. 11 is a diagram illustrating a specific example of digital watermark data including a unique ID, a MAC, and an ECC in units of delivery content.

As shown in FIG. 11, in the sub-content, a data row formed of [unique ID/MAC/EEC] is set in a repeated manner.

The server which delivers contents including sub-contents records management information including the unique ID of delivery content for each content delivery in a storage section of the server.

FIG. 12 shows an example of the data configuration of the management information which is held in the storage section of the server.

As shown in FIG. 12, the management information includes, for example, a unique ID corresponding to the delivery content, sub-content segment configuration information, delivery content information, delivery destination information, delivery user information, and delivery date information.

The sub-content segment configuration information is information showing where the unique ID, MAC, and ECC are recorded in the content constituent data. The sub-content segment configuration information is information showing which segments among the segments constituting the sub-content are a unique ID-recorded segment, a MAC-recorded segment, and an ECC-recorded segment.

FIG. 12 shows an example of the management information, and all these pieces of information may not be recorded. Information other than these pieces of information may be held as management information. The sub-content segment configuration information may not be set as registration information corresponding to the delivery content if it is delivered with a segment configuration which is set to have a unified data arrangement without being changed for each delivery content.

However, it is necessary that the unique ID which is identification information and the information for specifying the delivery destination are registered in association with each other.

7. Example of Configuration of Content Encryption Process

First, as described with reference to FIG. 3, the server which delivers contents generates and provides the main content constituted of a main image (primary video) and the sub-image constituted of a sub-image (secondary video) to the client.

The main content is content common to the clients, but the sub-content is content in which identification information different for each of the clients is recorded.

Any of these contents is set as a clip file which is an individual encrypted data file.

As an encryption key for content which is provided to the client, using the same encryption key is also possible, but encryption keys different in client units or in delivery process units may also be set and used.

An example of a process of generating and providing encrypted content using an encryption key different in client units or in delivery process units will be described with reference to FIG. 13 and the like.

Figure 13:
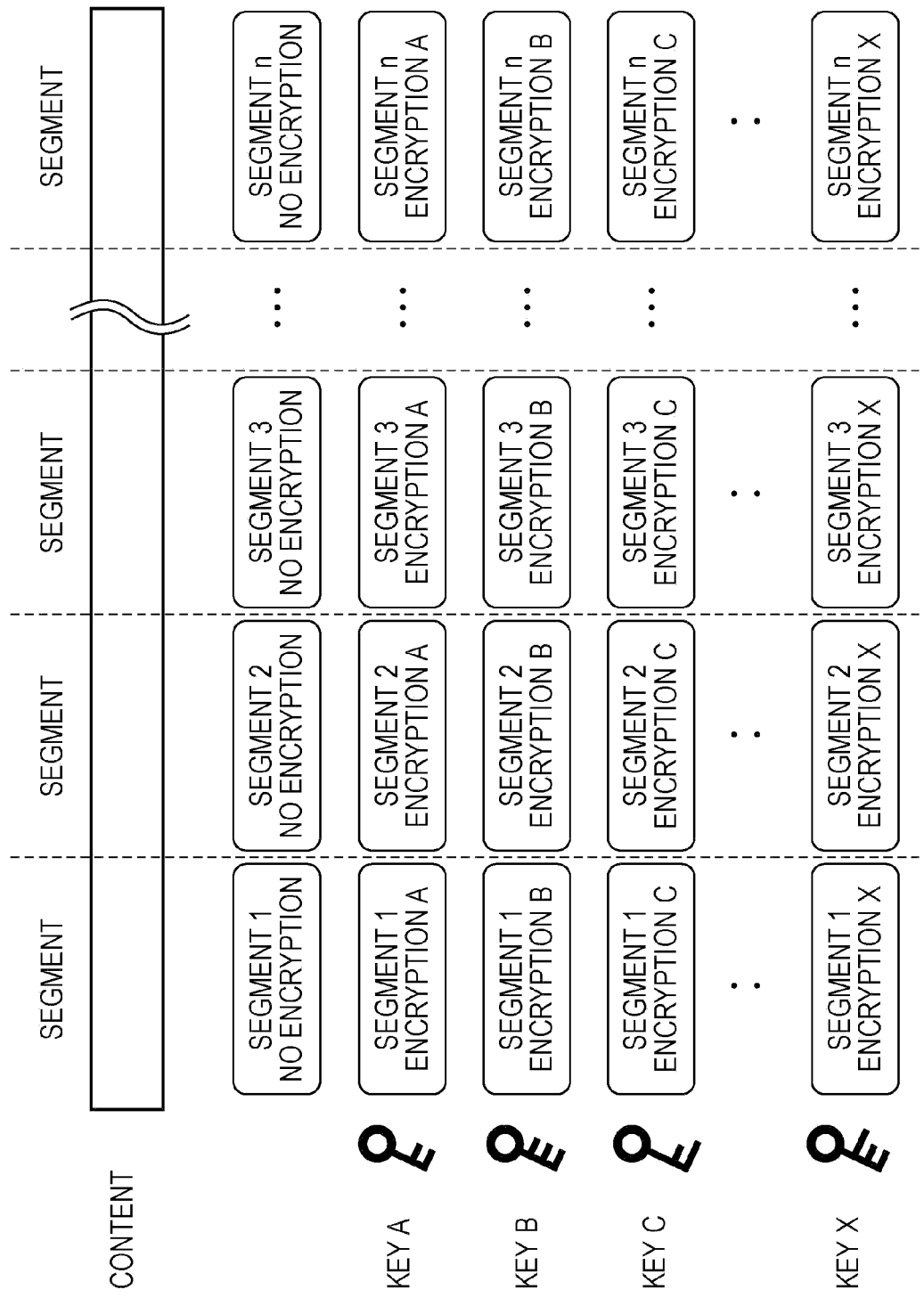
FIG. 13 is a diagram illustrating an example of a process of generating and providing encrypted content using an encryption key different in client units or in delivery process units.

FIG. 13 shows an example of content encryption in which an individual segment key is set as an encryption key in units of segment of sub-content.

For example, an individual encryption key (segment key) is assigned to the same segment as the above-described digital watermark-recorded segment to execute the encryption in units of segment.

Regarding the segment setting, the digital watermark-recorded segment and the encrypted segment may be common in the segment setting, and may also be different in the setting.

The server prepares many encryption keys (segment keys) in units of segment, which are applied to the encryption, and as shown in FIG. 13, generates in advance many encrypted contents formed of encrypted segments which are encrypted in units of segment by applying these keys.

As shown in FIG. 13, many kinds of sub-contents such as sub-content which is constituted only of segments encrypted by a key A, sub-content which is constituted only of segments encrypted by a key B, sub-content which is constituted only of segments encrypted by a key C, . . . , and sub-content which is constituted only of segments encrypted by a key X, other than content (sub-content formed of a sub-image) which is constituted only of non-encrypted segments are prepared in advance.

When delivering content, the server selects a combination of encrypted segments different in units of delivery content, and generates and provides sub-content formed of a set of the selected encrypted segments to the client.

For example, sub-content which is provided to a client C1 has a segment set using a key combination of a segment 1=segment 1 encrypted by an encryption key A, a segment 2=segment 2 encrypted by an encryption key B, a segment 3=segment 3 encrypted by an encryption key C, . . . .

Sub-content which is provided to a client C2 has a segment set using a key combination of a segment 1=segment 1 encrypted by an encryption key E, a segment 2=segment 2 encrypted by an encryption key F, a segment 3=segment 3 encrypted by an encryption key G, . . . .

In this manner, as shown in FIG. 13, the server creates in advance encrypted data in units of segment by applying the encryption keys A to X, and can generate delivery content only by a process of combining the encrypted data in the delivery process. This is the same process as the process of generating content including a different digital watermark data row which has been described with reference to FIG. 9.

By preparing in advance encrypted data in units of segment to which such many keys are applied, it is possible to efficiently generate and provide content to which a different combination of encryption keys is applied to the client.

When such a content delivery is executed, the server provides the set of encryption keys, which is used in the segment encryption, to the client together with the content.

Figure 14:
FIG. 14 is a diagram illustrating an example of a process of generating and providing encrypted content using an encryption key different in client units or in delivery process units.

As shown in FIG. 14, contents in units of segment, specifically, sub-content storing identification data using a digital watermark and a set of encryption keys which is applied to the encryption of the sub-content are transmitted to each of the clients.

Association information between the segment and the key showing which encryption key is applied to each segment is also provided.

When transmitting sub-content to which an encryption key different in units of delivery content or in client units is applied, the server also records key information provided to each client as management information.

FIG. 15 shows an example of this management information. The management information shown in FIG. 15 has a configuration in which encryption key information is added to the management information described with reference to FIG. 12.

In the encryption key information, information of the encryption keys applied to the encryption processes of the respective contents which are provided is recorded.

That is, encryption key information is recorded which is applied as an encryption key in units of segment described with reference to FIG. 13.

For example, as encryption key information applied to sub-content which is provided to a client C1, encryption key information showing the use of a key combination of a segment 1=encryption key A, a segment 2=encryption key B, a segment 3=encryption key C, . . . is recorded as management information in association with information on the delivery destination of the content.

In this manner, the key combination is set to be different in units of delivery content, and thus, for example, when the leakage of a key occurs, the leaked key or a combination of the keys is analyzed and matched to the management information shown in FIG. 15, whereby it is possible to estimate who is a client of the key leakage source.

8. Sequences of Server Content Generation and Provision

Sequences of content generation and provision which are executed in the server of a service provider or the like will be described with reference to the flowcharts shown in FIGS. 16 and 17.

(8-1. Server Content Generation Processing Sequence)

First, a content generation processing sequence which is executed in the server of a service provider or the like will be described with reference to the flowchart shown in FIG. 16.

The process according to the flow shown in FIG. 16 is executed in the data processing portion of the server.

First, in Step S101, sub-image data (secondary video) is generated by performing an image separation process on original data.

Next, in Step S102, the sub-image area in the original data is substituted with a signal different from the original image to generate main image data (primary video).

Next, in Step S103, the main image data (primary video) is encoded, and if necessary, is multiplexed with data such as a voice or a subtitle to generate a main clip file.

Next, in Step S104, the main clip file is encrypted to generate an encrypted main clip file.

Next, in Step S105, an ID which is client identification information is recorded (for example, recorded as a digital watermark) in the sub-image data (secondary video).

Next, in Step S106, the sub-image data (secondary video) is encoded, and if necessary, is multiplexed with other data to generate a sub-clip file.

Next, in Step S107, the sub-clip file is encrypted to generate an encrypted sub-clip file.

Next, in Step S108, a playlist file is generated as a reproduction control information file of the main clip file and the sub-clip file.

Next, in Step S109, the created user provision content is delivered to a user, and management information including association information between the unique ID and the delivery destination is registered.

The data which is provided to the client is generated through these processes.

In the process of recording the ID which is client identification information as, for example, a digital watermark in Step S105, first, as described with reference to FIGS. 8 and 9, it is possible to execute a process of generating various pieces of digital watermark data-recorded content by combining pieces of digital watermark-recorded data in units of segment.

In addition, in this Step S105, first, as described with reference to FIGS. 10 and 11, the ID information may be recorded together with the falsification verification value and the error correction code.

In addition, in the encryption of the sub-clip file in Step S107, first, as described with reference to FIG. 13 and the like, an encryption process in which an encryption key different in client units is applied may be executed by using an encryption key in units of segment.

(8-2. Server Content Provision Processing Sequence)

Next, a content provision processing sequence which is executed in the server of a service provider or the like will be described with reference to the flowchart shown in FIG. 17.

Figure 17:
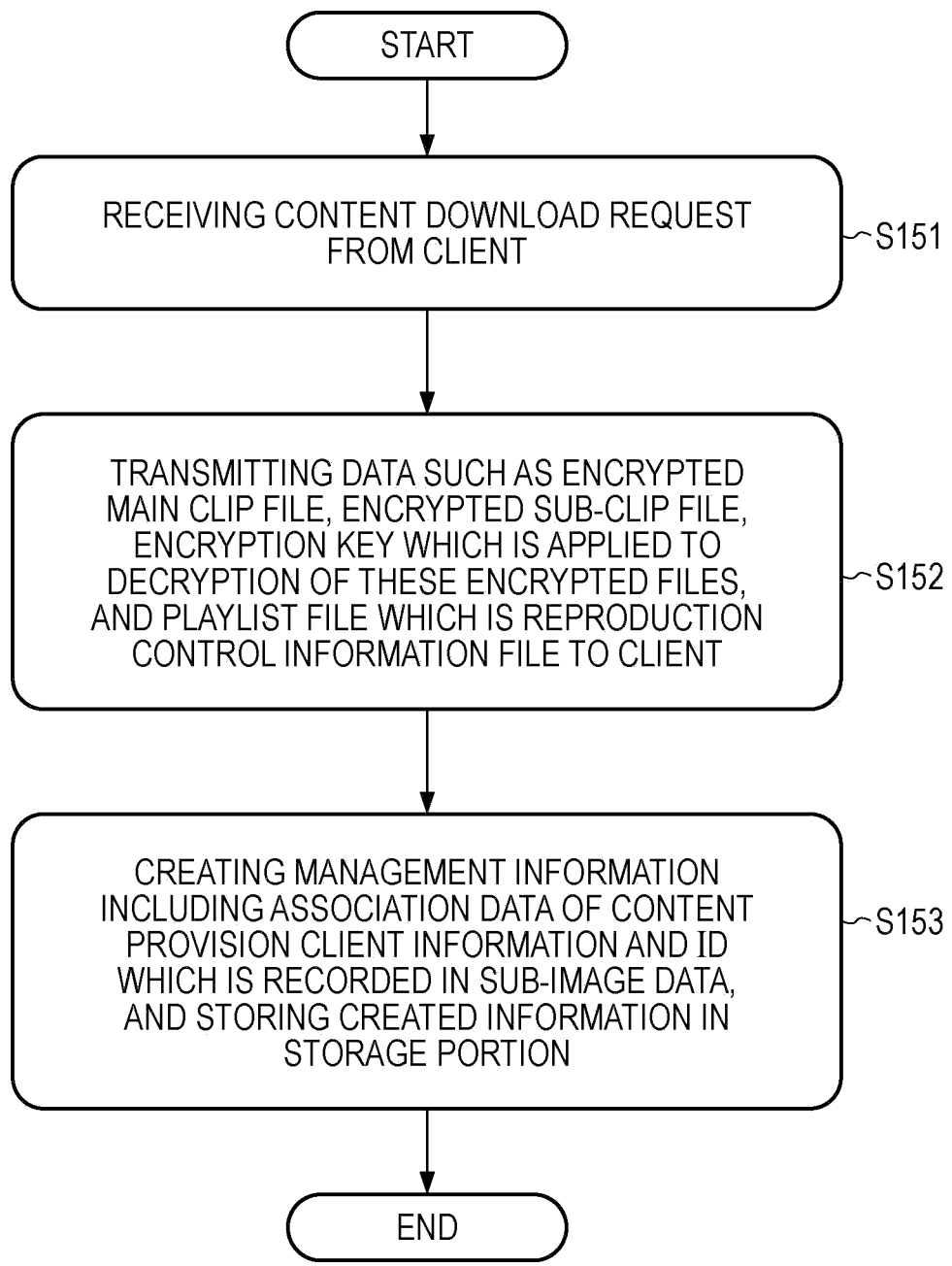

The process according to the flow shown in FIG. 17 is executed in the data processing portion of the server.

First, in Step S151, a content download request from a client is received.

Next, in Step S152, data such as an encrypted main clip file, an encrypted sub-clip file, an encryption key which is applied to the decryption of these encrypted files, and a playlist file which is a reproduction control information file is transmitted to the client.

Furthermore, in Step S153, management information including association data between the information on the content provision client and the ID recorded in the sub-image data is created and stored in the storage portion.

The management information in Step S153 is, for example, the management information described with reference to FIG. 12 or FIG. 15.

The management information is management information in which a unique ID which is client identification information and client information such as delivery destination information and delivery user information are associated with each other and recorded in content units provided to each of the clients.

When different combinations of encryption keys are set for each delivery content as described with reference to FIGS. 13 and 14, key information is also recorded in the management information as described with reference to FIG. 15.

9. Client Content Reproduction Sequence

Figure 18:
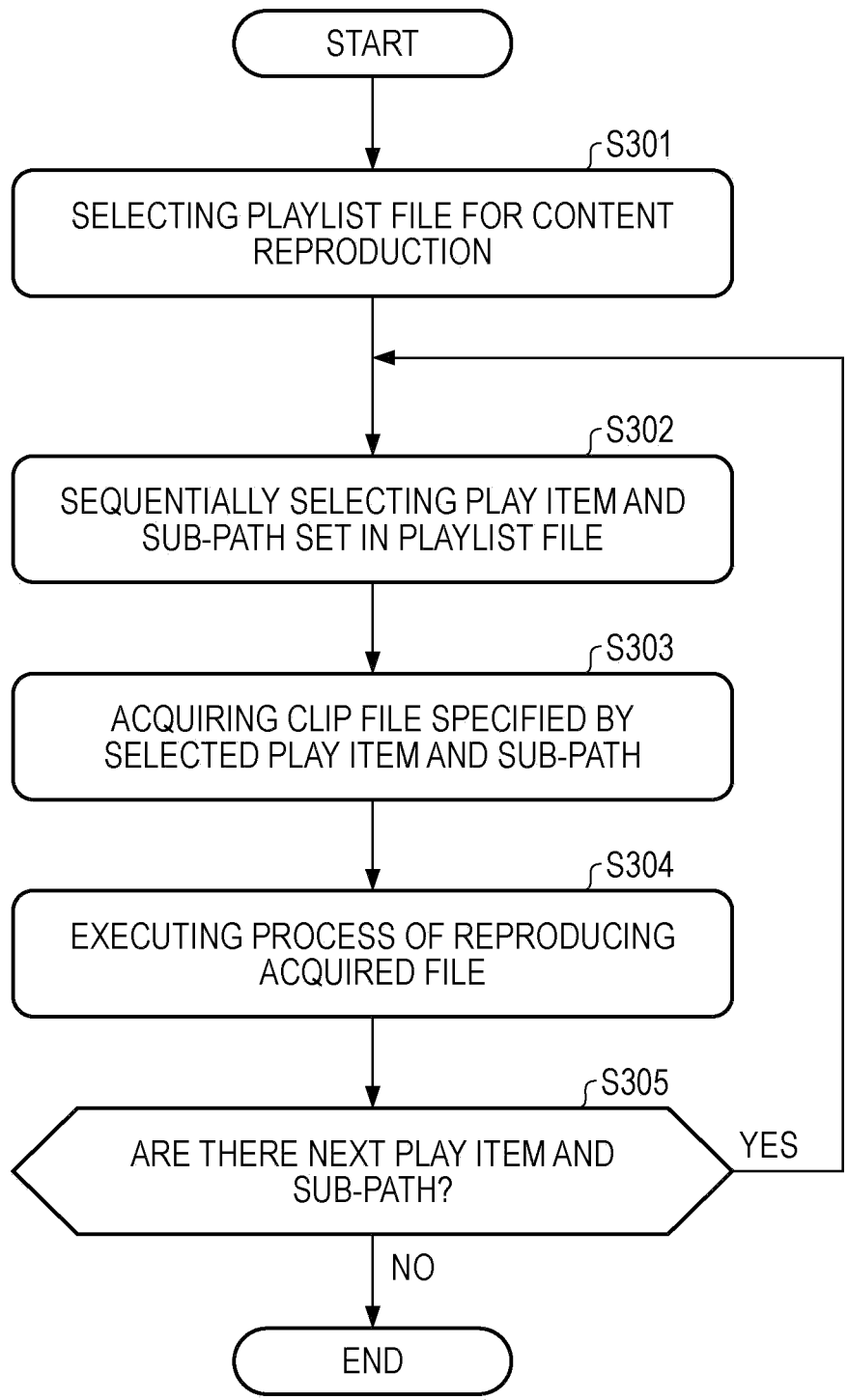
FIG. 18 is a diagram illustrating a content reproduction process with regard to a client.

Next, a content reproduction processing sequence with regard to a client will be described with reference to the flowchart shown in FIG. 18. This process is executed as a process of a data processing portion executing the reproduction process in a client device.

First, in Step S301, the client device executing the content reproduction process selects a playlist file for reproduction. This playlist file selection process is automatically selected in accordance with, for example, the designation of the title of reproduction content.

Next, in Step S302, play items and sub-paths set in the selected playlist file are sequentially selected. For example, a play item and a sub-path are selected from the top of the playlist file. When a user designates a reproduction start position, a play item and a sub-path corresponding to the designated position are selected.

As described with reference to FIG. 7, when an image obtained by a synthesis process of a main image and a sub-image is reproduced, the play item functions as reproduction designation information of a main clip storing the main image, and the sub-path functions as reproduction designation information of a sub-clip storing the sub-image.

Next, in Step S303, a clip file which is designated by the selected play item and sub-path is acquired, and in Step S304, a reproduction process thereof is executed.

In Step S305, it is determined whether there are the next play item and sub-path or not. When there are no next play item and sub-path, the determination result in Step S305 is No, and the content reproduction process ends.

When there are the next play item and sub-path, the determination result in Step S305 is YES. The process returns to Step S302 and the next play item and sub-path are selected to continue the process of Step S303 onward.

In this manner, due to the using of the play item which is reproduction designation information of the main clip storing the main image and the sub-path which is reproduction designation information of the sub-clip storing the sub-image in parallel, the process of reproducing the synthetic image in which the main image and the sub-image are synthesized is executed as described with reference to FIG. 6.

10. Server Origin Determination Processing Sequence Based on Illegally Distributed Content Next, an origin determination processing sequence which is executed when illegally distributed content is found will be described with reference to the flowchart shown in FIG. 19.

Figure 19:
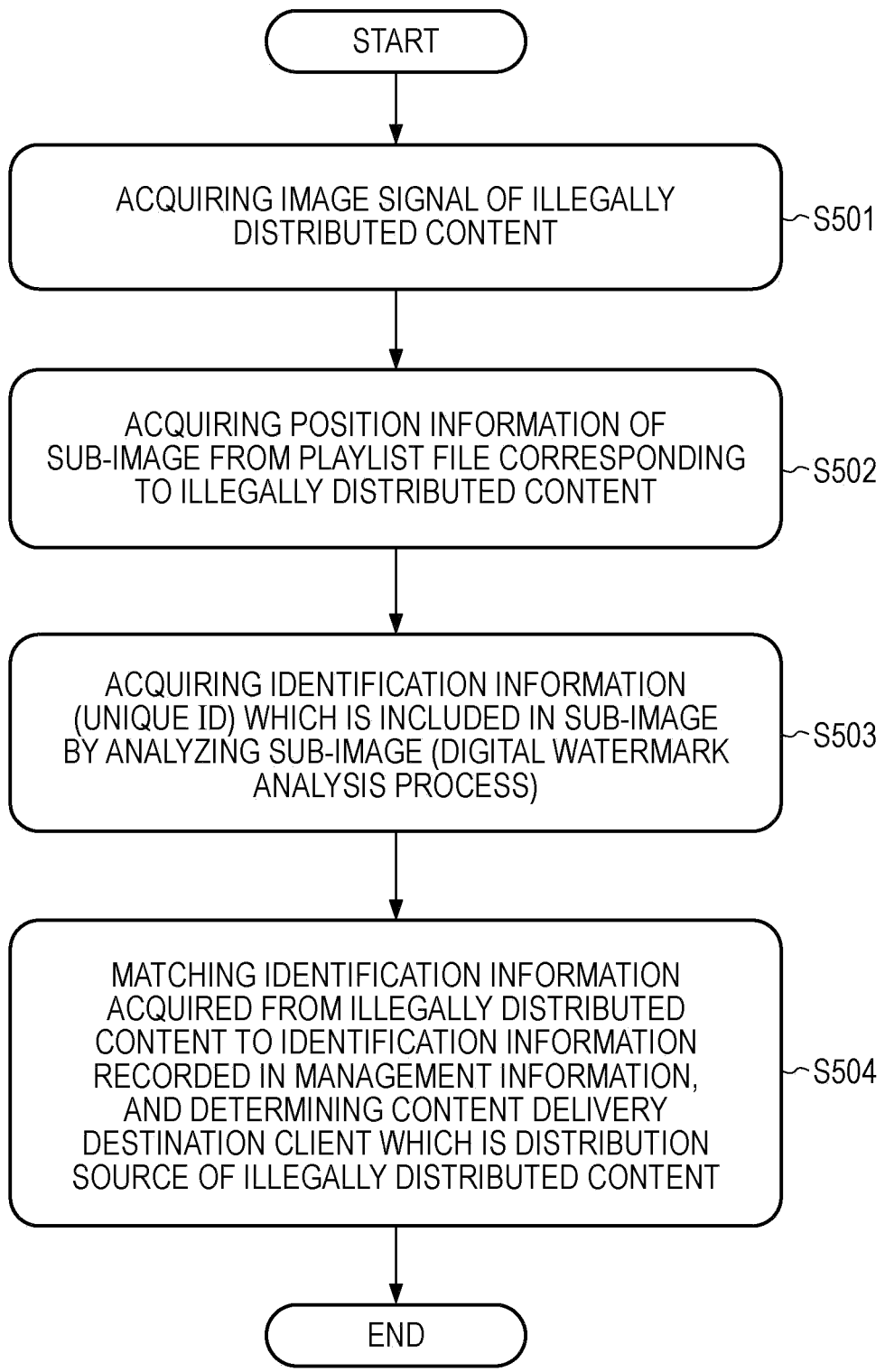
FIG. 19 is a diagram showing a flowchart illustrating an origin determination processing sequence which is executed when illegally distributed content is found.

The process according to the flow shown in FIG. 19 is, for example, a process which is executed in the data processing portion of the server of a service provider executing the delivery of the content.

First, in Step S501, the image signal of illegally distributed content is acquired.

The illegally distributed content is, for example, content which is set to be freely downloadable from a site to which anyone on the network is able to obtain access, copy content recorded on a disk which is illegally distributed, or the like.

Next, in Step S502, position information of a sub-image is acquired from a playlist file corresponding to the illegally distributed content.

As described with reference to FIG. 7, a process of displaying a first image (main image) and a second image (sub-image) in combination is referred to as Picture-In-Picture (PinP), and in the playlist file, type information (sub-path_type=5) regarding the type of a sub-path and information on the output position of the sub-image are recorded other than information on the play item and the sub-path defining the reproduction start position and the end position shown in FIG. 7. In Step S502, image position information of the sub-image is acquired from the playlist file.

Next, in Step S503, identification information (unique ID) which is included in the sub-image is acquired by analyzing the sub-image (digital watermark analysis process).

In this digital watermark analysis process, when an error correction code, a falsification verification value and the like are recorded as described with reference to FIGS. 10 and 11, an error correction process and a falsification verification process using these pieces of data are executed, and then the identification information which is a unique ID is read.

Next, in Step S504, the identification information acquired from the illegally distributed content is matched to identification information (unique ID) recorded in management information, and a distribution source of the illegally distributed content, that is, a client who delivered the content is determined.

The management information is the management information shown in FIG. 12 or 15 described above.

In the flow shown in FIG. 19, only the example of the process of analyzing the digital watermark data in the sub-image is described. However, as described with reference to FIGS. 13 to 15, regarding the sub-image, different combinations of encryption keys which are applied in units of segment are able to be provided to the respective clients.

When such a setting is used, on the basis of the illegally distributed key, the illegally distributed key and the information registered in the management information shown in FIG. 15 are matched to each other, and thus an origin of the illegally distributed key is able to be found.

11. Example of Hardware Configuration of Each Device

Figure 20:
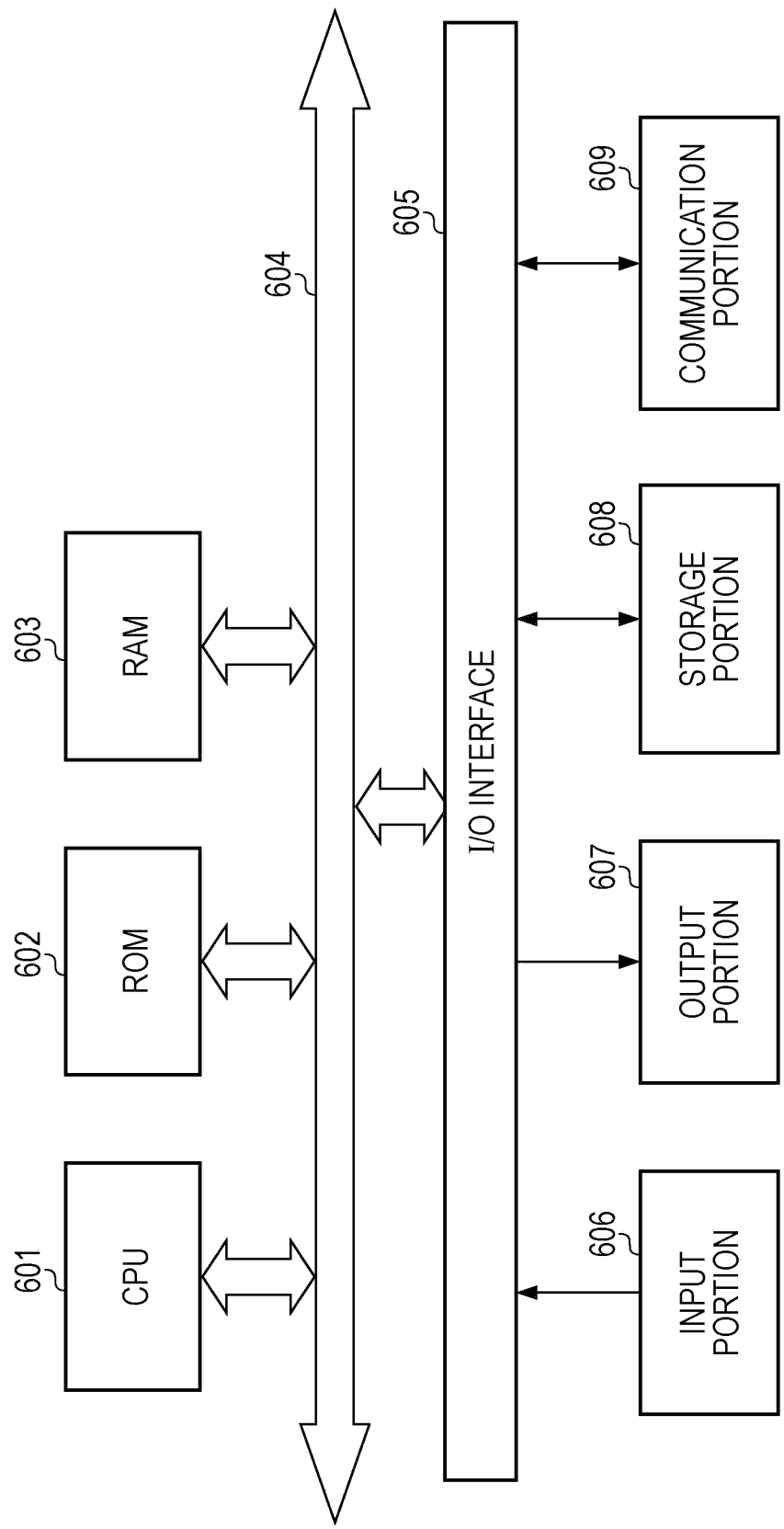
FIG. 20 is a diagram illustrating an example of the hardware configuration of the server.
Figure 21:
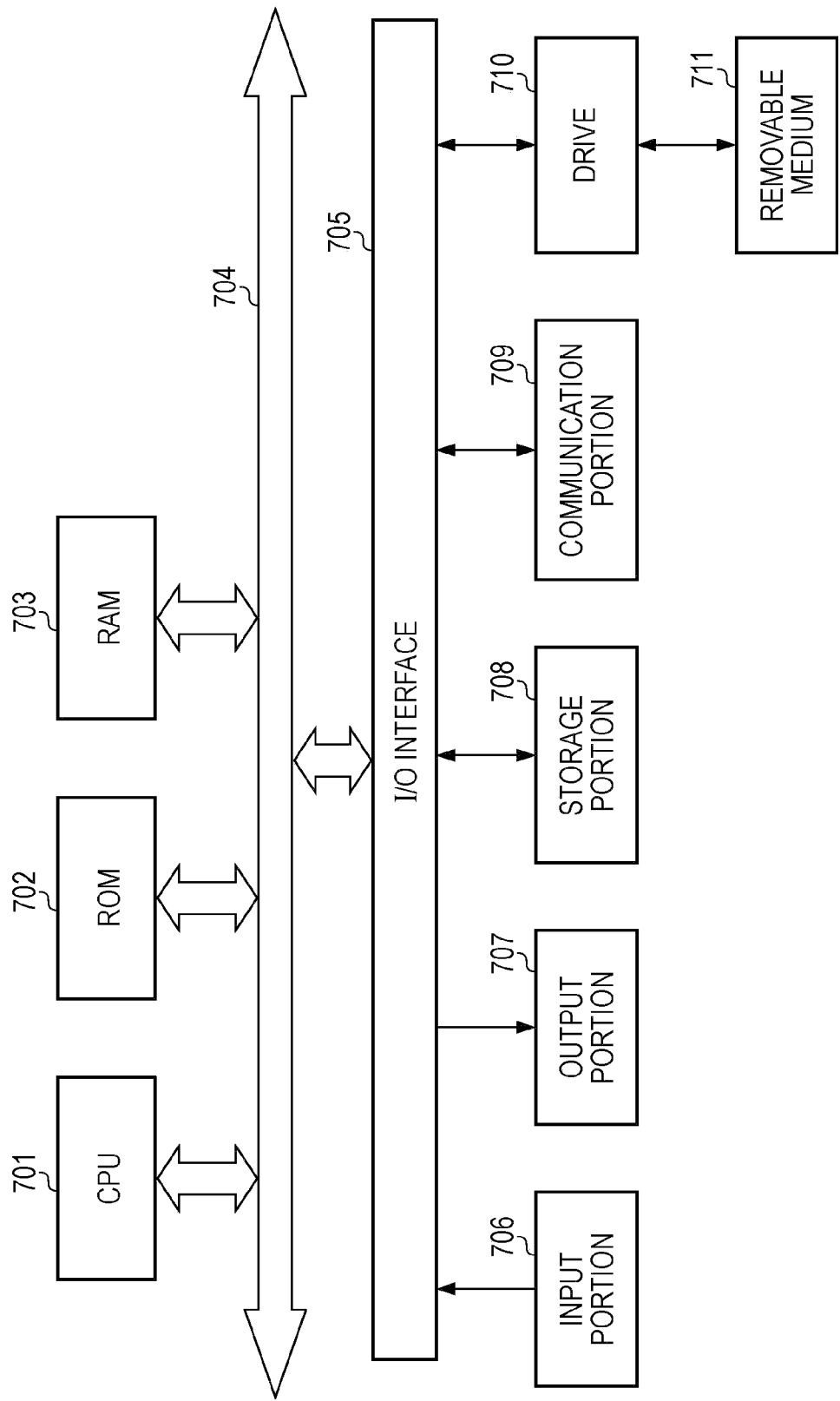
FIG. 21 is a diagram illustrating an example of the hardware configuration of a client.

Finally, an example of the hardware configuration of each of the devices executing the above-described processes will be described with reference to FIGS. 20 and 21.

First, an example of the hardware configuration of the server executing a content provision process will be described with reference to FIG. 20.

A Central Processing Unit (CPU) 601 functions as a data processing portion which executes various processes in accordance with a program stored in a Read Only Memory (ROM) 602 or a storage portion 608.

For example, the CPU 601 executes the process of generating content having a digital watermark as identification information (unique ID) recorded therein, the content provision process, the process of creating and recording management information, and the like, which have been described in the above-described embodiments. Programs to be executed by the CPU 601, data, and the like are appropriately stored in a Random Access Memory (RAM) 603. These CPU 601, ROM 602, and RAM 603 are connected to each other via a bus 604.

The CPU 601 is connected to an I/O interface 605 via the bus 604. An input portion 606 formed of various switches, a keyboard, a mouse, a microphone and the like and an output portion 607 formed of a display, a speaker and the like are connected to the I/O interface 605. The CPU 601 executes various processes in response to an instruction input from the input portion 606 and outputs process results to, for example, the output portion 607.

A storage portion 608 which is connected to the I/O interface 605 includes, for example, a hard disk, and stores programs to be executed by the CPU 601 and various pieces of data. For example, the management information described with reference to FIG. 6 is also recorded therein. A communication portion 609 communicates with an external device via the network such as the internet or the local area network.

Next, an example of the hardware configuration of a client device executing a process of receiving and reproducing content, and the like will be described with reference to FIG. 21.

A Central Processing Unit (CPU) 701 functions as a data processing portion which executes various processes in accordance with a program stored in a Read Only Memory (ROM) 702 or a storage portion 708.

For example, the CPU 701 executes the process of performing communication with the server, the process of recording data received from the server in the storage portion 708 (hard disk or the like), the process of reproducing data from the storage portion 708 (hard disk or the like), and the like, which have been described in the above-described embodiments.

Programs to be executed by the CPU 701, data, and the like are appropriately stored in a Random Access Memory (RAM) 703. These CPU 701, ROM 702, and RAM 703 are connected to each other via a bus 704.

The CPU 701 is connected to an I/O interface 705 via the bus 704. An input portion 706 formed of various switches, a keyboard, a mouse, a microphone and the like and an output portion 707 formed of a display, a speaker and the like are connected to the I/O interface 705. The CPU 701 executes various processes in response to an instruction input from the input portion 706 and outputs process results to, for example, the output portion 707.

A storage portion 708 which is connected to the I/O interface 705 includes, for example, a hard disk, and stores programs to be executed by the CPU 701 and various pieces of data. A communication portion 709 performs communication with an external device via the network such as the internet or the local area network.

A drive 710 which is connected to the I/O interface 705 drives a removable medium 711 such as a magnetic disk, an optical disc, a magnetic optical disc or a semiconductor memory and acquires various pieces of data such as recorded contents and programs.

The present disclosure has been described in detail with reference to the specific embodiments. However, it is obvious that those skilled in the art may make modifications and substitutions in the embodiments without departing from the gist of the present disclosure. That is, the present disclosure is disclosed in the form of an example and is not interpreted in a limited manner. The claims of the present disclosure may be reference to judge the gist of the present disclosure.

In addition, the series of processes described in the present disclosure is able to be executed by a hardware, a software, or a combination thereof. When the processes are executed by a software, a program having a processing sequence recorded therein is able to be installed and executed in a memory in a computer embedded in a dedicated hardware, or in a general-purpose computer capable of executing various processes. For example, the program is able to be recorded in advance on a recording medium. Other than installation in a computer from the recording medium, the program is able to be received via the network such as the Local Area Network (LAN) or the internet and installed in a recording medium such as a built-in hard disk.

The various processes described in the present disclosure may be not only executed time-sequentially in accordance with the description, but also executed in parallel or individually in accordance with the need or the processing capacity of a device which executes the processes. In addition, the system in the present disclosure is a logical aggregation of a plurality of devices, and the respective constituent devices may not be disposed in the same housing.

As described above, according to the configuration of an embodiment of the present disclosure, a configuration is provided in which from illegally distributed content, the origin thereof is able to be verified. A sub-image in which identification information of a content delivery client is recorded as, for example, a digital watermark in image data formed of a partial area of image data, and a main image in which the image signal of the sub-image area is deleted or substituted with a dummy signal are generated and provided to the client. Furthermore, management information in which the identification information recorded in the sub-image is associated with client information of the content provision destination is generated and managed. When illegally distributed content is found, the identification information recorded in the sub-image which is included in the illegally distributed content is analyzed and matched to data registered in the management information, and thus the delivery source thereof is able to be determined.

The present disclosure contains subject matter related to that disclosed in Japanese Priority Patent Application JP 2010-209733 filed in the Japan Patent Office on Sep. 17, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A content server comprising:
   an information processor operable to:
   generate a sub-image and a main image from image data, wherein the sub-image comprises a partial area of the image data, wherein the main image comprises the image data with the partial area deleted or substituted with a dummy signal and wherein identification information of a client is recorded in the sub-image;
   deliver the sub-image and the main image as content to the client;
   generate management information in which the identification information recorded in the sub-image is associated with content delivery destination information; and
   record the management information in a storage section, wherein a luma key area is set in the sub-image, wherein pixels in the luma key area have a specific luminance value, so that when the sub-image is reproduced, pixel values of the main image that correspond to the luma key area are output.

2. The content server according to claim 1, wherein the identification information is digital watermark data in the sub-image.

3. The content server according to claim 1, wherein the information processor is operable to:
   acquire the identification information included in the sub-image by analyzing the sub-image included in the delivered content; and
   specify the client by matching the acquired identification information with the management information.

4. The content server according to claim 1, wherein the information processor is operable to provide a playlist file as a reproduction control information file to the client for reproduction of a synthetic image by reproduction of the main image and the sub-image in parallel.

5. The content server according to claim 1, wherein the information processor is operable to:
   generate a plurality of different digital watermark-recorded sub-images in which digital watermark data different for each image data is recorded; and
   select a different combination of digital watermark-recorded sub-images for the client.

6. The content server according to claim 1, wherein the information processor is operable to:
   generate a plurality of different encrypted sub-images to which a plurality of encryption keys different for each image data are applied; and
   select a different combination of encrypted sub-images to generate encrypted content to be provided to the client.

7. The content server according to claim 6, wherein the information processor is operable to:
   generate the management information with the applied plurality of encryption keys, wherein the plurality of encryption keys are provided to the client and are associated with the content delivery destination information; and
   record the management information in the storage section.

8. The content server according to claim 7, wherein the information processor is operable to acquire the plurality of encryption keys and specify the client as a destination of delivery of the content by matching the acquired plurality of encryption keys with the management information.

9. A content server comprising:
   an information processor for content reproduction operable to:
   acquire a sub-image file storing a sub-image and a main image file storing a main image, wherein the sub-image comprises a partial area of a image data, the main image comprises the image data with the partial area deleted or substituted with a dummy signal and wherein identification information of a content delivery client is recorded in the sub-image; and
   apply a playlist file which is a reproduction control information file for executing the main clip file and the sub-clip file in parallel to reproduce a synthetic image of the main image and the sub-image, wherein a luma key area is set in the sub-image, wherein pixels in the luma key area have a specific luminance value, so that when the sub-image is reproduced, pixel values of the main image that correspond to the luma key area are output.

10. An information processing method which is executed in an information processor, the method comprising:
    generating a sub-image and a main image from image data, wherein the sub-image comprises a partial area of the image data, the main image comprises the image data with the partial area deleted or substituted with a dummy signal and wherein identification information of the client is recorded in the sub-image;
    delivering the sub-image and the main image as content to a client;
    generating management information in which the identification information recorded in the sub-image is associated with content delivery destination information; and
    recording the management information in a storage section, wherein a luma key area is set in the sub-image, wherein pixels in the luma key area have a specific luminance value, so that when the sub-image is reproduced, pixel values of the main image that correspond to the luma key area are output.

11. A non-transitory computer readable medium having stored thereon, a computer program having at least one code section executable by a computer, thereby causing the computer to perform the steps comprising:
    generating a sub-image and a main image from image data, wherein the sub-image comprises a partial area of the image data, the main image comprises the image data with the partial area deleted or substituted with a dummy signal and wherein identification information of the client is recorded in the sub-image;
    delivering the sub-image and the main image as content to a client;
    generating management information in which the identification information recorded in the sub-image is associated with content delivery destination information; and
    recording the management information in a storage section, wherein a luma key area is set in the sub-image, wherein pixels in the luma key area have a specific luminance value, so that when the sub-image is reproduced, pixel values of the main image that correspond to the luma key area are output.

* * * * *